US006058336A

United States Patent [19]

Hayama et al.

[11] Patent Number: 6,058,336

[45] Date of Patent: May 2, 2000

[54] ELECTRONIC APPARATUS, METHOD OF PROCESSING WORKPIECE THEREFOR AND METHOD OF GUIDING OPERATION WITH OPERATING ELEMENT THEREOF

[75] Inventors: Hitoshi Hayama, Nagano; Kenji Watanabe, Tokyo; Takanobu Kameda, Tokyo; Tomoyuki Shimmura, Tokyo, all of Japan

[73] Assignee: Seiko Epson Corporation, Tokyo, Japan

[21] Appl. No.: 08/774,851

[22] Filed: Dec. 27, 1996

[30] Foreign Application Priority Data

| | | | |
|---|---|---|---|
| Dec. 28, 1995 | [JP] | Japan | 7-341992 |
| Dec. 28, 1995 | [JP] | Japan | 7-341997 |
| Jan. 29, 1996 | [JP] | Japan | 8-013339 |

[51] Int. Cl.[7] .......... G06F 19/00

[52] U.S. Cl. .......... 700/117; 700/118

[58] Field of Search .......... 200/117, 118, 200/121, 197, 207, 212; 355/85, 402; 399/13

[56] References Cited

U.S. PATENT DOCUMENTS

| | | | |
|---|---|---|---|
| 3,987,215 | 10/1976 | Cortellino | 427/43 |
| 4,532,005 | 7/1985 | Grieco et al. | 156/661.1 |
| 5,138,469 | 8/1992 | Wood et al. | 359/3 |
| 5,222,818 | 6/1993 | Akiyama et al. | 400/61 |
| 5,253,334 | 10/1993 | Kimura et al. | 395/102 |
| 5,310,624 | 5/1994 | Ehrlick | 430/322 |
| 5,314,256 | 5/1994 | Niwa | 400/61 |
| 5,440,979 | 8/1995 | Bonham et al. | 101/91 |
| 5,492,420 | 2/1996 | Nunokawa et al. | 400/208 |
| 5,605,404 | 2/1997 | Nunokawa et al. | 400/62 |
| 5,669,304 | 9/1997 | Kuriyama et al. | 701/401.1 |

FOREIGN PATENT DOCUMENTS

| | | |
|---|---|---|
| 63-260019 | 10/1988 | Japan . |
| 06226946 | 8/1994 | Japan . |
| 06266025 | 9/1994 | Japan . |
| 07186506 | 7/1995 | Japan . |
| 07290809 | 7/1995 | Japan . |
| 07257001 | 10/1995 | Japan . |

*Primary Examiner*—Paul P. Gordon
*Attorney, Agent, or Firm*—Loeb & Loeb, LLP

[57] ABSTRACT

There is provided an electronic apparatus for carrying out physical processing on a workpiece removably mounted in a pocket formed in a body of the apparatus, based on internal data. The mounting of the workpiece is detected. An alarm is given to indicate that no workpiece is mounted in the pocket, if the mounting of the workpiece is not detected after the electronic apparatus is started. In another form, text data used last time is deleted based on results of discrimination as to whether or not a workpiece different in kind from one mounted last time is mounted, based on results of detection of the kind of the mounted workpiece. There is also provided an electronic apparatus for carrying out exposure as physical processing on a workpiece having a portion formed of a photosensitive resin having a temperature-dependent property, based on internal data. Internal data defining exposure time periods corresponding to ambient temperatures is stored. Exposure is carried out over an exposure time period set according to a detected ambient temperature based on the internal data. There is also provided a method of guiding user's manual operations of an electronic apparatus. One of the LED's in an active position of a plurality of operating positions of an operating element for processing is caused to flicker. One of the LED's in one of the plurality of operating positions of the operating element to be made active next is operated, after the processing in the active position of the operating element.

24 Claims, 24 Drawing Sheets

SQUARE STAMP (SMALL)

SQUARE STAMP (LARGE)

PERSONAL NAME STAMP

BUSINESS STAMP (SMALL)

BUSINESS STAMP (LARGE)

ADDRESS STAMP

MAXIMUM SIZE STAMP

FIG. 19

| TITLE | LEVEL1 | LEVEL2 |
|---|---|---|
| ENVIRONMENT | BEEPER | OFF ON |
| | DENSITY | +3 ␣ +2 ␣ +1 ␣ NORMAL -1 ␣ -2 ␣ -3 ␣ |
| | DEMO MODE | |
| | POSITION | PRO7 ␣ PRO6 ␣ PRO5 ␣ PRO4 ␣ PRO3 ␣ PRO2 ␣ PRO1 ␣ NORMAL<br>RETRO1 ␣ RETRO2 ␣ RETRO3 ␣ RETRO4 ␣ RETRO5 ␣ RETRO6 ␣ RETRO7 ␣ |

FIG. 20A
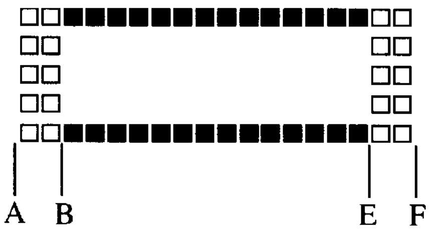
FIG. 20B
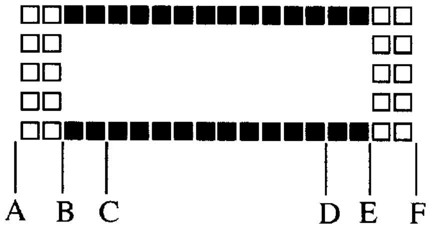
FIG. 20C
| | TYPE A (IN DOTS) | | TYPE B (IN DOTS) | |
|---|---|---|---|---|
| | CHARACTER SIZE AB(=EF) | CHARACTER AREA BE | CHARACTER SIZE AB(=EF) | CHARACTER AREA BE |
| PERSONAL NAME STAMP | 6 | 224 | 16 | 204 |
| BUSINESS STAMP (SMALL) | 8 | 288 | 24 | 256 |
| BUSINESS STAMP (LARGE) | 12 | 320 | 32 | 280 |
| SQUARE STAMP (MIDDLE) | 4 | 120 | 12 | 104 |
| ADDRESS STAMP | 16 | 393 | 48 | 329 |

FIG. 21

| | ADDRESS/BUSINESS STAMP(LARGE) | BUSINESS STAMP(SMALL) | PERSONAL NAME STAMP | SQUARE STAMP |
|---|---|---|---|---|
| 1 | NO FRAME | SAME AS LEFT | SAME AS LEFT | SAME AS LEFT |
| 2 | 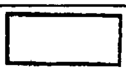 | SAME AS LEFT | SAME AS LEFT | 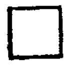 |
| 3 | 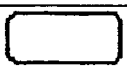 | SAME AS LEFT | SAME AS LEFT | 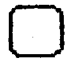 |
| 4 |  | SAME AS LEFT | SAME AS LEFT |  |
| 5 |  | SAME AS LEFT | SAME AS LEFT | 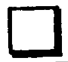 |
| 6 |  | SAME AS LEFT | SAME AS LEFT |  |
| 7 | 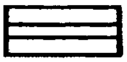 | SAME AS LEFT | NO OPTION |  |
| 8 | 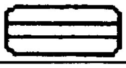 | SAME AS LEFT | NO OPTION |  |
| 9 | 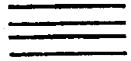 | SAME AS LEFT | NO OPTION |  |
| 10 | 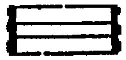 | SAME AS LEFT | NO OPTION |  |
| 11 | 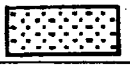 | SAME AS LEFT | SAME AS LEFT | 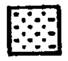 |
| 12 | NO OPTION |  | SAME AS LEFT |  |
| 13 | NO OPTION |  | SAME AS LEFT |  |
| 14 |  | SAME AS LEFT | SAME AS LEFT |  |
| 15 |  | SAME AS LEFT | SAME AS LEFT | NO OPTION |
| 16 | 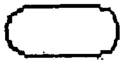 | SAME AS LEFT | SAME AS LEFT | NO OPTION |
| 17 |  | SAME AS LEFT | SAME AS LEFT | NO OPTION |
| 18 |  | SAME AS LEFT | SAME AS LEFT | NO OPTION |
| 19 |  | SAME AS LEFT | SAME AS LEFT | NO OPTION |
| 20 |  | SAME AS LEFT | SAME AS LEFT | NO OPTION |

FIG. 22

| | ADDRESS/BUSINESS STAMP(LARGE) | BUSINESS STAMP(SMALL) | PERSONAL NAME STAMP | SQUARE STAMP |
|---|---|---|---|---|
| 21 | 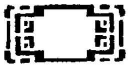 | SAME AS LEFT | SAME AS LEFT | NO OPTION |
| 22 |  | SAME AS LEFT | SAME AS LEFT | NO OPTION |
| 23 |  | SAME AS LEFT | SAME AS LEFT | NO OPTION |
| 24 |  | SAME AS LEFT | SAME AS LEFT | NO OPTION |
| 25 |  | SAME AS LEFT | SAME AS LEFT | NO OPTION |
| 26 |  | SAME AS LEFT | SAME AS LEFT | NO OPTION |
| 27 |  | SAME AS LEFT | SAME AS LEFT | NO OPTION |
| 28 |  | SAME AS LEFT | SAME AS LEFT | NO OPTION |
| 29 |  | SAME AS LEFT | SAME AS LEFT | NO OPTION |
| 30 |  | SAME AS LEFT | SAME AS LEFT | NO OPTION |
| 31 |  | SAME AS LEFT | SAME AS LEFT | NO OPTION |
| 32 |  | SAME AS LEFT | SAME AS LEFT | NO OPTION |

FIG. 24

| AMBIENT TEMPERATURE °C | EXPOSURE TIME sec |
|---|---|
| ~7.5 | 135 |
| 7.5~12.5 | 115 |
| 12.5~17.5 | 102 |
| 17.5~22.5 | 95 |
| 22.5~ | 90 |

F I G. 2 5

| SITUATION | FUNCTION SWITCH POSITION | | LIGHT-EMITTING ELEMENTS | | | DISPLAY |
|---|---|---|---|---|---|---|
| | BEFORE | AFTER | OPEN | INPUT/ PLATE-MAKING | EX-POSURE | |
| NO-UNIT | ANY | OPEN | ○ | ○ | ○ | |
| | ANY | INPUT/PLATE-MAKING | ⊘ | ○ | ○ | NO-UNIT → |
| | ANY | EXPOSURE | ⊘ | ○ | ○ | NO-UNIT → |
| | ANY | OFF | ○ | ○ | ○ | |
| •UNIT SET<br>•NO CHARACTERS FOR TEXT | OFF | INPUT/ PLATE-MAKING | ○ | ● | ○ | LINE HEAD MARK |
| •UNIT SET<br>•NO CHARACTERS FOR TEXT<br>•PLATE-MAKING BUTTON PUSHED | INPUT/PLATE-MAKING | | ○ | ● | ○ | SOFT ALARM |
| •UNIT SET<br>•CHARACTERS ENTERED FOR TEXT<br>•NO PLATE-MAKINNG SHEET<br>•PLATE-MAKING BUTTON PUSHED | INPUT/PLATE-MAKING | | ○ | ◌ | ○ | INSERT SHEET! |
| •UNIT SET<br>•CHARACTERS ENTERED FOR TEXT<br>•PLATE-MAKINNG SHEET INSERTED<br>•PLATE-MAKING BUTTON PUSHED | INPUT/PLATE-MAKING | | ○ | ◌ | ○ | UNDER PLATE-MAKING! |
| AFTER PLATE-MAKING COMPLETED | INPUT/PLATE-MAKING | | ○ | ● | ● | ENTERED TEXT |
| AFTER PLATE MAKING | INPUT/ PLATE-MAKING | EX-POSURE | ○ | ○ | ◌ | UNDER EXPOSURE! |
| EXPOSURE NOR-MALLY TERMINATED | EXPOSURE | | ⊘ | ○ | ○ | REMOVE UNIT → |
| •UNIT SET<br>•CHARACTERS ENTERED FOR TEXT<br>•PLATE-MAKING BUTTON NOT PUSHED | INPUT/ PLATE-MAKING | EX-POSURE | ○ | ⊘ | ○ | CARRY OUT PLATE-MAKING → |
| | | | | | | |

○ OFF ⊘ QUICK FLICKERING
● ON ◌ SLOW FLICKERING

ELECTRONIC APPARATUS, METHOD OF PROCESSING WORKPIECE THEREFOR AND METHOD OF GUIDING OPERATION WITH OPERATING ELEMENT THEREOF

BACKGROUND OF THE INVENTION

1. Field of the Invention

This invention relates to an electronic apparatus, and more particularly to an electronic apparatus applied e.g. to a stamp-making apparatus for physically (photochemically) processing a stamp body mounted in a body thereof as a workpiece based on internal data for making a stamp, and a method of processing a workpiece by the use of the electronic apparatus as well as a method of guiding operation of the electronic apparatus performed by the use of an operating element thereof.

2. Prior Art

As is generally known, there are various types of stamps having different shapes (particularly, stamp surfaces). Therefore, when a stamp is made (i.e. a stamp image is engraved) on a stamp surface of a stamp body as a workpiece by the use of a stamp-making apparatus, it is required to process or produce data (internal data) in a manner suitable for each stamp surface to be processed or engraved. However, if the data is processed uniformly for all types of stamp bodies, details of data processing are required to conform to data having the largest number of processing items, so that depending on the size of a stamp surface, part of the data processing becomes useless, which results in waste of processing time. Further, there can be cases where the input data is found to be unsuitable for the stamp surface, and all the data processing as well as user's data entry operations are in vain. In such a case, a sequence of operations by the user for the data processing have to be carried out all over again.

Further, if data entry is permitted before a stamp body is mounted as a workpiece, there is a possibility that data processed is unsuitable for the stamp surface of a stamp body mounted thereafter, resulting in waste of labor and time similarly to the above case. Moreover, it is likely that there will be supplied in the future stamp bodies having shapes different from the predetermined ones of stamp bodies currently supplied. In such an event, if a new stamp body having a different shape from the predetermined ones is mounted, the uniform data processing adapted to the predetermined stamp bodies can no longer set a stamp-image-forming area suitable for the new stamp body, which will make it impossible to make a stamp therefrom.

A conventional stamp-making apparatus makes a stamp by exposing a stamp surface made of ultraviolet-curing resin to ultraviolet rays for a predetermined time period via a mask having a stamp image formed thereon in a predetermined manner, and thereafter washing the stamp surface with water to remove uncured portions of the ultraviolet-curing resin to thereby engrave a stamp image on the stamp surface. An exposure time period required for properly curing the ultraviolet-curing resin depends on the ambient temperature, so that if the exposure time period is fixed, undesired results can occur. Further, it is likely that various kinds of suitable ultraviolet-curing resins having different photosensitivities to ultraviolet rays will be produced in the future. Therefore, the exposure time period set in a manner exclusively suitable for a specific kind of ultraviolet-curing resin is likely to make the stamp-making apparatus unsuitable for stamp bodies using such new kinds of ultraviolet-curing resins.

Even if the above problems are overcome, due to complicated operations required therefor, a user can find it difficult to operate the apparatus, and wastefully take time to operate the same properly. Moreover, if the apparatus is erroneously operated by the user, there is a fear of a stamp body being wasted. This problem will be particularly serious when the stamp body is expensive. Supposedly, an owner's manual for the electronic apparatus will be helpful in reducing erroneous operations by the user, but, still no doubt, the manual operation of the apparatus will be extremely troublesome.

SUMMARY OF THE INVENTION

It is a first object of the invention to provide an electronic apparatus which is capable of easily processing a workpiece mounted in a body thereof, without waste of time and material.

It is a second object of the invention to provide an electronic apparatus which is capable of easily processing a workpiece mounted in a body thereof in a manner adaptable to changes in processing conditions of the workpiece including the size, characteristics, etc. thereof, without waste of time and material.

It is a third object of the invention to provide a method of easily processing a workpiece mounted in a body thereof in a manner adaptable to changes in processing conditions of the workpiece including the size, characteristics, etc. thereof, without waste of time and material, while preventing errors in operation by the user.

It is a fourth object of the invention to provide a method of guiding manual operation of an operating element of the electronic apparatus, for easily processing a workpiece mounted in a body thereof in a manner adaptable to changes in processing conditions of the workpiece including the size, characteristics, etc. thereof, without waste of time and material, while preventing errors in operation by the user.

To attain the first object, according to a first aspect of the invention, there is provided an electronic apparatus having a body formed with a pocket for removably mounting a workpiece therein, the electronic apparatus carrying out physical processing on the workpiece mounted in the pocket based on internal data.

The electronic apparatus according to the first aspect of the invention is characterized by comprising:

detecting means for detecting mounting of the workpiece in the pocket, and alarm means for giving an alarm indicating that no workpiece is mounted in the pocket, if the detecting means does not detect the mounting of the workpiece after the electronic apparatus is started.

In an apparatus which processes a workpiece in a manner dependent on the kind of a workpiece, if the apparatus is operated when the workpiece is not set in the pocket, there is a high possibility of a sequence of manual operations by the user and data processing by the apparatus will be in vain. According to the electronic apparatus of the first aspect of the invention, alarms in the form of indications, displayed images, sounds, etc. can be given to make the user aware that no unit is mounted in the pocket. Therefore, it is possible to prevent the user from carrying out useless operations when the workpiece is not set, such as data entry operations. This prevents the apparatus from carrying out useless or unnecessary data processing, as well. The alarm for warning against useless operations is preferably effected through a plurality of alarm elements, e.g. by indications by light-emitting elements (LED's), visual images on the display, or sounds of beeps.

To this end, preferably, the electronic apparatus includes a plurality of alarm elements, and alarm element-selecting means for selecting at least one of the plurality of alarm elements, and the alarm means gives the alarm by using the at least one of the plurality of alarm elements selected by the alarm element-selecting means.

According to this preferred embodiment, when the alarm elements include indications by light-emitting elements, visual messages on display, and beeps by a beeper, the user can select a manner of giving alarms as desired. For example, he can set the beeper to silence, when he considers the indications by the light-emitting elements and the visual messages on display are sufficient for the alarm.

Preferably, the electronic apparatus includes demonstration display means for carrying out demonstration display to introduce the electronic apparatus to customers, and demonstration display-switching means for switching between a state of execution of the demonstration display and a state of non-execution of the demonstration display, and the demonstration display means is capable of operating irrespective of whether the alarm means gives the alarm, when the detecting means does not detect the mounting of the workpiece and the demonstration display-switching means is switched to the state of execution of the demonstration display.

According to this preferred embodiment, when the electronic apparatus is shown for sale in a store with no workpiece mounted in the pocket, the demonstration display enables the apparatus to introduce itself to customers, which makes it possible to save salesclerks the trouble of explaining the features of the product, i.e. electronic apparatus. Further, it is preferable that the demonstration is programmed such that a sequence of operations can be followed by the customer on the screen as if a workpiece were mounted in the pocket. Since no workpiece is mounted actually, waste of workpieces for the sake of introduction to the product can be avoided.

To attain the first and second objects, according to a second aspect of the invention, there is provided an electronic apparatus having a body formed with a pocket for removably mounting each of a plurality of kinds of workpieces therein, the electronic apparatus carrying out physical processing on the each of plurality of kinds of workpieces mounted in the pocket in a manner dependent on a kind of the each of the plurality of kinds of workpieces, based on internal data.

The electronic apparatus according to the second aspect of the invention is characterized by comprising kind-detecting means for detecting the kind of the each of the plurality of kinds of workpieces mounted in the pocket, workpiece-discriminating means for discriminating whether or not a workpiece different in kind from a workpiece mounted on an immediately preceding occasion is mounted, based on results of detection by the kind-detecting means, and data-deleting means for deleting text data used on the immediately preceding occasion, based on results of discrimination by the workpiece-discriminating means.

According to the electronic apparatus of the second aspect of the invention, when a workpiece different from one set on the immediately preceding occasion is mounted, the text data used in the immediately preceding occasion is deleted. Therefore, it is possible to prevent data entry operations and data processing from being executed carelessly using the text data used on the immediately preceding occasion. Therefore, possibility of useless data entry operations and data processing is precluded, and hence inappropriate processing or working of the workpiece can be avoided.

Preferably, the data-deleting means deletes the text data used on the immediately preceding occasion, after text data for the workpiece different in kind from the workpiece mounted on the immediately preceding occasion is entered.

According to this preferred embodiment, the text data used on the immediately preceding occasion is deleted only after text data for the workpiece different from the immediately preceding one is entered. Therefore, even if an undesired workpiece is mounted by mistake, the immediately preceding data can be saved from loss, if the user becomes aware of his error and replaces the workpiece mounted by a desired one before entering the text data.

To attain the second object, according to a third aspect of the invention, there is provided an electronic apparatus having a body formed with a pocket for removably mounting each of a plurality of kinds of workpieces therein, the electronic apparatus carrying out physical processing on the each of plurality of kinds of workpieces mounted in the pocket in a manner dependent on a kind of the each of the plurality of kinds of workpieces, based on internal data.

The electronic apparatus according to the third aspect of the invention is characterized by comprising kind-detecting means for detecting the kind of the each of the plurality of kinds of workpieces mounted in the pocket, and parameter-setting means for setting parameters for use in processing internal data required in the physical processing executed in the manner dependent on the kind of the each of the plurality of kinds of workpieces.

According to the electronic apparatus of the third aspect of the invention, the internal data required in processing or working the workpiece is processed in a manner dependent on the kind of workpiece, it is possible to process data for physically processing the workpiece in an accurate manner. In the case of the workpiece being a stamp body of a stamp, the parameters include, e.g. a size of characters, such as letters and figures, to be entered as elements of a stamp image, and a size of an area where the characters can be arranged for layout, as well as execution of character layout processing, available types of predetermined forms of frames of the stamp image, etc. That is, since these parameters are set in a manner dependent on the type of the workpiece (stamp body), in comparison with a case in which data processing is uniformly executed in an identical manner regardless of difference in type between workpieces, the amount of data processing is reduced for all workpieces but the one having the largest number of contents of processing. Therefore, it is possible to prevent the electronic apparatus from executing unnecessary processing but enables the same to carry out only necessary processing promptly.

Preferably, the parameter-setting means includes memory means for storing processing sizes corresponding to the plurality of kinds of workpieces, mode changeover means for switching a mode of internal processing of the electronic apparatus to a processing size entry mode for entering a processing size of an area of the workpiece to be processed, when the kind-detecting means detects a different kind of workpiece mounted in the pocket, which is different in shape different from shapes of the plurality of kinds of workpieces, and processing size-setting means for, in response to the processing size entered, selecting one of the predetermined processing sizes which is closest in shape to the processing size entered and at the same time smaller than the processing size entered, to thereby set the selected one of the predetermined processing sizes as a processing size of the different kind of workpiece mounted in the pocket, when the internal processing of the electronic apparatus is in the processing size entry mode.

According to the preferred embodiment, when a different kind of workpiece having a different shape from shapes of the predetermined workpieces is mounted in the pocket, one of the predetermined processing sizes which is closest in shape to the processing size of the mounted workpiece and at the same time smaller than the processing size of the same is set as the processing size for the physical (photochemical) processing of the workpiece. This makes it possible to produce internal data corresponding to the set processing size, and carry out the physical processing based on the internal data. That is, even on a workpiece having a different shape from the predetermined ones can be processed without problems.

Preferably, the electronic apparatus includes display means, and the mode changeover means changes a screen of the display means to a screen in which a processing size can be entered, when the internal processing of the electronic apparatus is in the processing size entry mode.

According to this preferred embodiment, by changing the screen of the display to a screen for entering a size of a workpiece, it is possible to show an image for advising the user to enter the size of the workpiece, more particularly, the size of an area to be processed, and thereby enable the user to enter the size with ease, by following the image of advice.

Preferably, the mode changeover means permits a plurality of processing-related elements including a processing size to be entered in a predetermined format, when the internal processing of the electronic apparatus is in the processing size entry mode.

According to this preferred embodiment, when the internal processing of the electronic apparatus is in the processing size entry mode, it is possible to enter the processing-related elements including a processing size in a predetermined format. Therefore, it is possible to change various settings of processing data required for physical processing of the workpiece. This enables a workpiece which is different in size and material than the predetermined ones to be physically processed with ease.

More preferably, the workpiece has a work surface formed of a photosensitive resin, and the physical processing is carried out by exposure of the photosensitive resin to light.

According to this processing, it is possible to carry out physical processing of a workpiece having a work surface formed of a photosensitive resin, such as a ultraviolet-curing resin.

Preferably, the mode changeover means permits an exposure time period to be entered as one of the plurality of processing-related elements when the internal processing of the electronic apparatus is in the processing size entry mode.

According to this preferred embodiment, it is possible to enter exposure time period to be entered as one of the plurality of processing-related elements when the internal processing of the electronic apparatus is in the processing size entry mode, whereby it is possible to change settings of exposure time periods. This makes it possible to carry out physical processing of a workpiece having a portion formed with a photosensitive resin different in sensitivity from a photosensitive resin used in the predetermined workpieces, without problems.

To attain the second object, according to a fourth aspect of the invention, there is provided an electronic apparatus for carrying out exposure as physical processing on a workpiece having a portion formed of a photosensitive resin having a temperature-dependent property, based on internal data.

The electronic apparatus according to the fourth aspect of the invention is characterized by comprising memory means for storing internal data defining exposure time periods corresponding to ambient temperatures, temperature-detecting means for detecting an ambient temperature, exposure time-setting means for setting an exposure time period according to the ambient temperature detected by the temperature-detecting means based on the internal data, and exposure means for carrying out exposure on the workpiece over the exposure time period set by the exposure time-setting means.

According to the electronic apparatus of the fourth aspect of the invention, it is possible to carry out physical processing of a workpiece having a processing area formed of a photosensitive resin, such as a ultraviolet-curing resin, by exposure carried out over the exposure time period. Further, optimal exposure time periods corresponding to ambient temperatures are stored as internal data, and an exposure time period for the mounted workpiece is set according to a detected ambient temperature, whereby it is possible to carry out favorable processing.

Preferably, the electronic apparatus includes entry means capable of permitting an exposure time period for a new kind of workpiece to be entered in a predetermined format, the entry means forming data of new exposure time periods corresponding to the ambient temperatures based on entry of the exposure time period for the new kind of workpiece effected in the predetermined format, and causing the memory means to store the data of new exposure time periods as part of the internal data.

According to the preferred embodiment, exposure time periods for a new type of workpiece can be newly defined and stored as internal data. That is, it is possible to carry out favorable physical processing of the new type of which workpiece which is different in sensitivity of a photosensitive material forming a processing area or surface than that of the predetermined types of workpieces of exposure time periods are already defined in the internal data, by exposure of the new type of workpiece over an exposure time period suitable for the sensitivity of the photosensitive material thereof. Accordingly, it is possible to process workpieces in an adapted manner even if they are changed in photosensitivity of the photosensitive resin in the future.

Preferably, the entry means permits a coefficient of the exposure time periods corresponding to the ambient temperatures to be entered in the predetermined format, and produces data of the exposure time periods by arithmetic operations based on the coefficient.

According to this preferred embodiment, by merely entering a coefficient, it is possible to set new exposure time periods for processing with ease, whereby it is made possible to easily carry out favorable processing of a workpiece which is different in sensitivity of a photosensitive resin of the processing area or surface.

Preferably, the entry means permits an equation of a quadratic function defining exposure time periods with respect to ambient temperatures to be entered in the predetermined format, and produces data of the exposure time periods by arithmetic operations based on the equation of the quadratic function.

According to this preferred embodiment, by merely entering an equation of a quadratic function, it is possible to set new exposure time periods for processing with ease, whereby it is made possible to easily carry out favorable processing of a workpiece which is different in sensitivity of a photosensitive resin of the processing area or surface.

To attain the third object, according to a fifth aspect of the invention, there is provided a method of processing a workpiece by an electronic apparatus, the method comprising the step of carrying out exposure on a workpiece having a portion formed of a photosensitive resin having a temperature-dependent property as physical processing over a time period corresponding to an ambient temperature.

According to the method of the fifth aspect of the invention, exposure of a photosensitive resin, such as a ultraviolet-curing resin, which has a time-dependent property, can be carried out in a manner dependent on the ambient temperature.

To attain the fourth object, according to a sixth aspect of the invention, there is provided a method of guiding manual operations of an electronic apparatus to be effected by a user in a manner following a predetermined procedure by the use of an operating element of the electronic apparatus, for causing the electronic apparatus to carry out various kinds of processing.

The method according to sixth aspect of the invention is characterized by comprising the steps of arranging marks for kinds of processing of the electronic apparatus, and light-emitting means for respective ones of the marks, in a manner corresponding to a plurality of operating positions of the operating element, causing one of the light-emitting means in an active position of the plurality of operating positions of the operating element to flicker, to thereby indicate execution of a kind of processing corresponding to the active position of the plurality of operating positions of the operating element, and causing another of the light-emitting means in another of the plurality of operating positions of the operating element to be made active next to be operated, after completion of the processing corresponding to the active position of the plurality of operating positions of the operating element, to thereby guide the user to a next step of processing.

According to the method of the sixth aspect of the invention, the user of the electronic apparatus can operate the same in a manner guided by flickering of related ones of the light-emitting elements. Therefore, he can carry out a predetermined sequence of operations smoothly without consulting the owner's manual.

Preferably, operation of the one of the light-emitting means in the one of the plurality of operating positions of the operating element to be made active next is lighting.

According to this preferred embodiment, it is clearly known from the operation of each light-emitting element whether the indication shows the active position or a guide to a next step.

Preferably, when the operating element is operated in an erroneous manner, one of the light-emitting means in a proper one of the plurality of operating positions of the operating element is caused to flicker at time intervals different from time intervals of flickering made to indicate execution of the kind of the processing corresponding to the active position of the plurality of operating positions of the operating element.

According to this preferred embodiment, the user of the electronic apparatus can deal with an erroneous operation promptly.

The above and other objects, features, and advantages of the invention will become more apparent from the following detailed description taken in conjunction with the accompanying drawings.

BRIEF DESCRIPTION OF THE DRAWINGS

FIGS. 7A and 7B are diagrams which are useful in explaining construction of a stamp body of a square stamp, in which:

FIG. 7A shows the stamp body of the square stamp in a state mounted in the pocket; and FIG. 7B shows the bottom of the stamp body of the square stamp;

FIGS. 7C and 7D are diagrams which are useful in explaining construction of a stamp body of a business stamp, in which FIG. 7C shows the stamp body of the business stamp in a state mounted in the pocket; and FIG. 7D shows the bottom of the stamp body of the business stamp;

FIG. 19 shows a table showing options in setting up processing environment of the electronic apparatus according to the embodiment;

FIG. 20A is a diagram of an example of an area in which characters forming a stamp image are permitted to be arranged for layout;

FIG. 20B is a diagram of an example of an area set by character layout processing in which characters forming a stamp image are permitted to be arranged for layout;

FIG. 20C shows a table which provides listing of character sizes and predetermined values of corresponding areas for arranging characters for layout, set according to the type of a stamp body;

FIG. 21 shows a table which provides listing of various predetermined forms of stamp frames which are employed by the electronic apparatus according to the embodiment;

FIG. 22 shows a continued part of the FIG. 21 table;

FIG. 24 shows a table which provides listing of exposure time periods set according to ambient temperatures; and FIG. 25 shows a table which provides listing of states a function switch, LED's, and a display, corresponding to respective situations of the stamp-making apparatus.

DETAILED DESCRIPTION

The invention will now be described in detail with reference to the drawings showing an embodiment thereof.

Figure 1A:
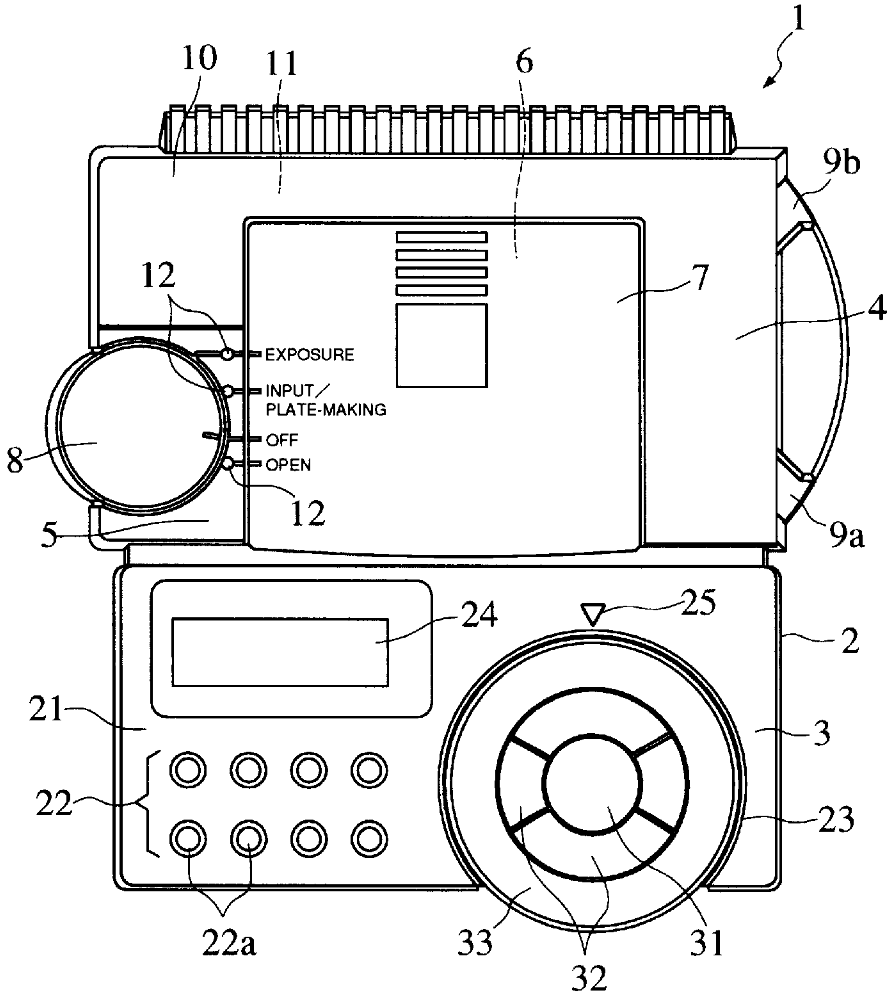
FIG. 1A is a plan view of an appearance of a stamp-making apparatus incorporating an electronic apparatus according to an embodiment of the invention is carried out.
Figure 1B:
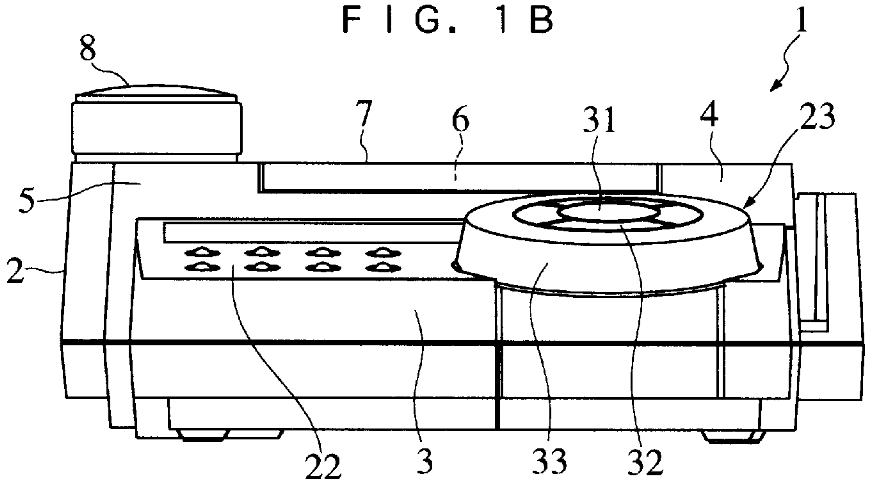
FIG. 1B is a front view showing an appearance of the stamp-making apparatus.
Figure 11:
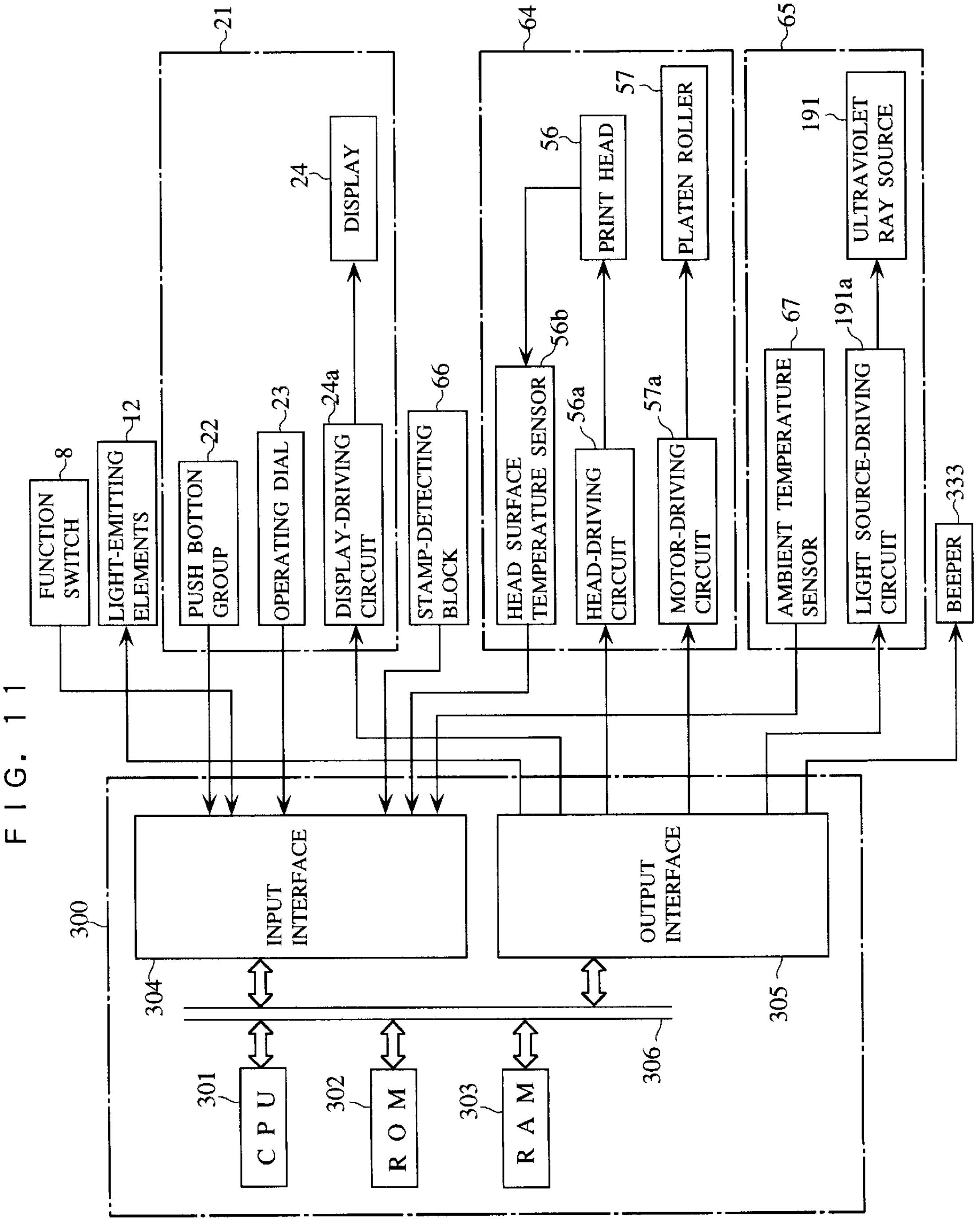
FIG. 11 is a block diagram of a control block and devices connected thereto of the stamp-making apparatus.

Referring first to FIGS. 1A and 1B, there is shown a stamp-making apparatus 1 which incorporates an electronic apparatus according to an embodiment of the invention, and carries out a method of processing a workpiece and a method of guiding operation of an operating element of the stamp body. The stamp-making apparatus 1 makes a desired stamp by exposing a stamp body having a stamp surface made of ultraviolet-curing resin to ultraviolet rays via a mask of an ink ribbon printed with a stamp image including images of characters and patterns. The electronic apparatus carries out processing for forming a stamp image, including processing for internal processing environment integrity, plate-making processing, and processing for exposure. The method of processing a workpiece is used for properly carrying out the exposure, and the method of guiding operation of an operating element for guiding user's manual operation of the stamp-making apparatus 1. FIG. 1A is a plan view of the apparatus, while FIG. 1B is a front elevation of the same. FIG. 11 is a block diagram of a control system of the apparatus.

As shown in FIGS. 1A and 1B, the stamp-making apparatus 1 includes a casing 2 having upper and lower divisional portions, an electronic block 3 arranged in a front part of the casing 2, and a mechanical block 4 arranged in a rear part of the same. The mechanical block 4 is comprised of a mechanical block body 5, a pocket 6 formed in a central area of the mechanical block for receiving therein a stamp body A as a stamping-making object material to mount the stamp body A in the mechanical block body 5, and a lid 7 for opening and closing the pocket 6, which is formed with a window. In a left side portion of the mechanical block 4 as viewed in the figures, a function switch 8 is provided for switching the operation of the stamp-making apparatus 1 between plate-making (printing) and exposure, as well as for permitting the lid 7 to be opened. Information of each switching operation of the function switch 9 is sent to an input interface 304 of a control block 300, referred to hereinafter, while indications of “EXPOSURE”, “INPUT/PLATE-MAKING”, “OFF” and “OPEN” are provided at respective operating positions. At the operating positions of “EXPOSURE”, “INPUT/PLATE-MAKING”, and “OPEN”, there are provided respective light-emitting elements 12 connected to an output interface 305 of the control block 300. Further, in a right side portion of the mechanical block 4, there are formed an inserting slot 9*a* for feeding a plate-making sheet B from which is made a stamp character label, referred to hereinafter, and a take-out slot 9*b* for delivering the plate-making sheet B therefrom. Further, the mechanical block 4 has a maintenance cover 10 removably mounted on part thereof outside the pocket 6, and an ink ribbon cartridge 11 carrying an ink ribbon C is mounted under the maintenance cover 10.

The electronic block 3 has an operating block 21 formed on the top thereof and contains the control block 300 therein. The operating block 21 includes a push button group 22 and an operating dial 23 both connected to the input interface 304 of the control block 300, and an display-driving circuit (see FIG. 11) connected to the output interface 305 of the control block 300 and an display 24 driven by the display-driving circuit 24*a*. The operating dial 23 has a trial structure of an execution key 31 having a circular shape and arranged in the center, a cursor/conversion key 32 having four divisional blocks arranged along the outer periphery of the execution key 31 to form an annular shape, and a character entry key 33 having an annular shape and arranged along the outer periphery of the cursor/conversion key 32. On the surface of the character entry key 33, hirakana characters representative of the Japanese syllabary, not shown, etc. are printed. The inputting of stamp characters is carried out by first setting a character size by pushing a predetermined button 22*a* of the push button group 22, turning the character entry key 33 to set each of desired hirakana characters to a triangle mark 25, and pushing the execution key 31 whenever each of the desired hirakana characters is set to the triangle mark 25, followed by converting desired ones of the input hirakana characters to kanji characters by operating the cursor/conversion key 32. When desired stamp characters are formed on the display 24, they are settled.

Figure 2:
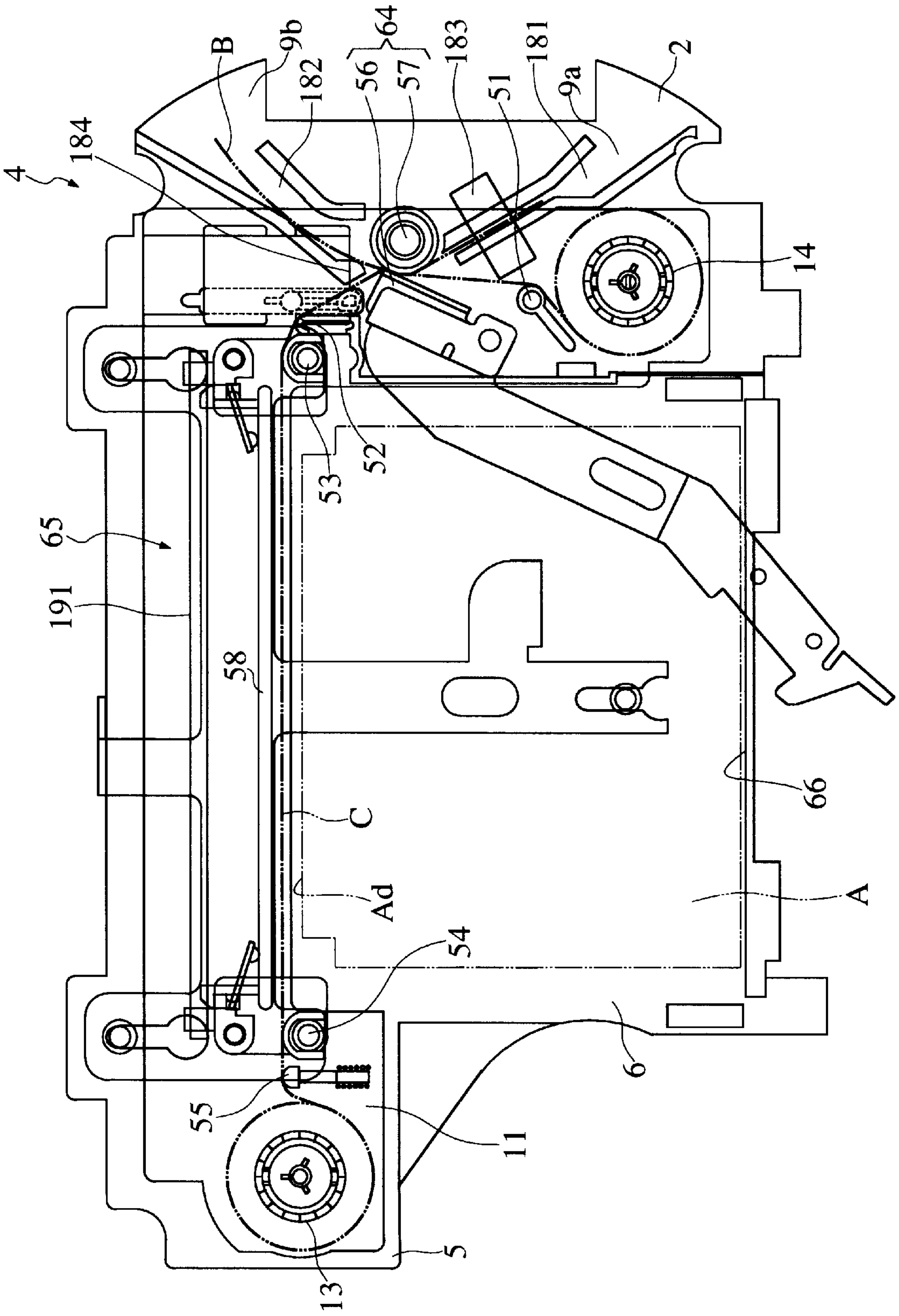
FIG. 2 is a plan view of an internal construction of a mechanical block of the stamp-making apparatus.

Now, a sequence of operations for making a stamp will be briefly described with reference to FIGS. 1A and 1B, and 2. First, the function switch 8 is rotated from “OFF” position as a standby position to “OPEN” position to open the lid 7, and a stamp body A is set in the pocket 6. As the stamp body A is set, the type of the stamp body A is detected by a stamp-detecting block 66 connected to the input interface 304 of the control block 300.

Then, the function switch 8 is rotated to “INPUT/PLATE-MAKING POSITION” to shift the function of the apparatus to plate-making, and the push button group 22 and the operating dial 23 are operated to input stamp characters. When the inputting of stamp characters is completed, the plate-making sheet B on which a stamp character label is provided is set by inserting the same into the inserting slot 9*a*.

Then, a predetermined button 22*a* of the push button group 22 is operated to cause the apparatus to execute the plate-making operation, i.e. printing of the stamp characters. The printing is effected simultaneously on the ink ribbon C and the plate-making sheet B. When the printing is completed, the ink ribbon (printed portion thereof) C is fed or advanced to set the same for exposure to ultraviolet rays, and at the same time plate-making sheet B is discharged from the take-out slot 9*b*. When it is confirmed by the plate-making sheet B discharged that there is no error in the printed stamp characters, the function switch 8 is rotated to the "EXPOSURE" position to shift the function of the apparatus to exposure, thereby causing an exposure block 65, referred to hereinafter, to perform exposure of the stamp body to ultraviolet rays.

When the exposure to ultraviolet rays is completed, the function switch 8 is rotated to the "OPEN" position to open the lid 7, and then the stamp body A is removed from the pocket 6 to wash the same. The washing completes the stamp. Before or after completion of the stamp, the stamp character label is peeled off the plate-making sheet B to attach the same on the back of the stamp.

Next, out of the component parts and elements of the stamp-making apparatus 1, ones associated with the control block 300, described in detail hereinafter, will be described with reference to FIGS. 2 to 11, one by one.

The ribbon cartridge 11 is constructed such that it is removable from the mechanical block body 5, and it is replaceable together with a casing thereof when the ink ribbon C is used up. As shown in FIG. 2, the ribbon cartridge 11 has a take-up reel 13 arranged at one end thereof and a supply reel 14 arranged at the other end thereof. The ink ribbon C is rolled out from the supply reel 14, fed along a feed path in the form of a rotation of an inverted-L shape as viewed in FIG. 2, and taken up by the take-up reel 13. The feed path in the form of a rotation of an inverted-L shape has a shorter side portion which a printing block 64, referred to hereinafter, faces and a longer side portion which the exposure block 65, referred to hereinafter, faces. The printing block 64 faces the ink ribbon C and the plate-making sheet B simultaneously, and the exposure block 65 faces the ink ribbon C printed with the image of the stamp characters.

The ink ribbon C is comprised of a transparent ribbon tape and ink coated thereon. In the present embodiment, it has a thickness of 6 $\mu$m. When the printing block 64 of the apparatus carries out printing on the ink ribbon C, a portion of ink coated on the ink ribbon, which defines a character, is transferred to the plate-making sheet B, whereby the ribbon tape of the ink ribbon C is formed with a negative image by a transparent portion from which the portion of ink defining the character has been transferred, while the plate-making sheet B is formed with a positive image by the transferred portion of ink defining the character. The ink ribbon C is sent forward to the exposure block 65 to use the resulting negative image-formed portion thereof as a mask in carrying out the exposure, while the plate-making sheet B is delivered from the apparatus for confirmation of the stamp characters and affixing the same to the stamp thus made.

Figure 4:
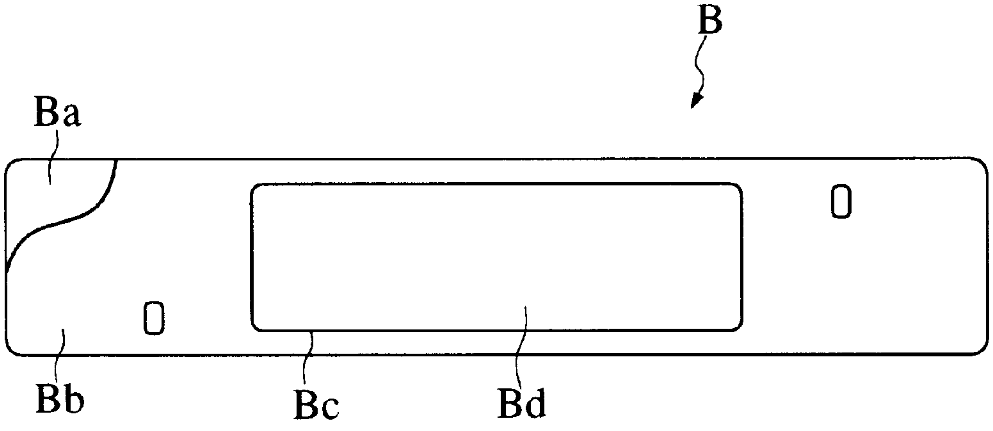
FIG. 4 is a view showing a structure of a plate-making sheet.

As shown in FIG. 4, the plate-making sheet B is a laminate of a base sheet Ba and an adhesive sheet Bb, generally in the form of a strip. The adhesive sheet Bb is formed with cutting lines Bc defining a rectangular area. The rectangular area of the adhesive sheet Bb is peeled off the base sheet Ba along the cutting lines Bc to form the stamp character label Bd to be affixed to the back of the stamp. There are provided several types of the stamp body A which are different in shape from each other according to the use of stamps, and there are also provided respective corresponding types of the plate-making sheet which are different in the shape of an area of the stamp character label Bd (shape and size of an area defined by cutting lines).

Figure 3:
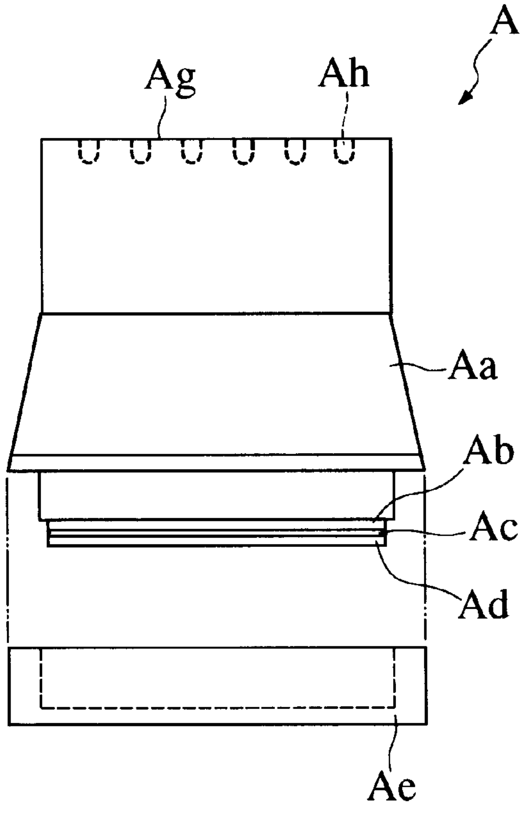
FIG. 3 is a view showing a structure of a stamp body.

On the other hand, as shown in FIG. 3, the stamp body A is comprised of a stock Aa (formed of a resin in the present embodiment), a thin sponge Ab (foamed urethane) affixed to a front end of the stock Aa, an ultraviolet-insensitive resin base Ac affixed to the sponge Ab, and an ultraviolet-curing resin affixed to the resin base Ac to form a stamp surface Ad. The ultraviolet-curing resin portion (stamp surface Ad) of the stamp body A is exposed to ultraviolet rays with the ink ribbon C as a mask, whereby portions of the stamp surface Ad corresponding to the stamp characters are cured. In this state, the stamp body A is taken out of the pocket 6, and washed with water to remove uncured portions of the stamp surface, which are soluble in water, from the stamp surface Ad. Thus the stamp is completed. Symbol Ae in the figure designates a cap made of resin.

Next, the printing block 64 will be described with reference to FIGS. 2 and 11. The printing block 64 includes a head-driving circuit 56*a* and a motor-driving circuit 57*a* both of which are connected to the output interface 305 of the control block 300, the print head (thermal head) 56 driven by the head-driving circuit 56*a* for printing stamp characters on the ink ribbon C, a platen roller 57 for feeding the ink ribbon C in a manner timed to printing operations of the print head 56, and a head temperature sensor 56*b* arranged on a head surface of the print head 56. Further, the casing 2 is formed with a feeding passage 181 through which the plate-making sheet B is fed to a contacting area between the print head 56 and the platen roller 57 and a delivery passage 182 through which the plate-making sheet B is delivered. The feeding passage 181 is formed with the inserting slot 9*a* which is open to the outside of the apparatus, at an upstream end thereof, and the delivery passage 182 is formed with the take-out slot 9*b* which is open to the outside of the apparatus, at a downstream end thereof.

The platen roller 57 is a drive roller as described hereinabove, and when the ink ribbon C is rolled out from the supply reel 14, it pulls in the plate-making sheet B between the print head 56 and itself to thereby bring a portion of the ink ribbon C and a portion of the plate-making sheet B, one upon the other, onto the print head 56. The print head 56 is a thermal head, and thermally transfer ink coated on the ribbon tape of the ink ribbon C to the plate-making sheet B. This transfer of the ink peels portions of ink corresponding to stamp characters off the ink ribbon C to reveal corresponding portions of the transparent base of the ribbon tape, while the peeled portions of the ink are attached to the plate-making sheet B as the stamp characters. The head surface temperature sensor 56*b* is formed by a temperature sensor, such as a thermistor, arranged on a surface of the print head 56 in an intimately contacting manner, and connected to the input interface 304 of the control block 300 for sending information of a temperature of the print head 56 detected thereby.

On the feeding passage 181 faces a sensor 183 which detects insertion of the plate-making sheet B and a feeding reference position of the same. The plate-making sheet B inserted into the feeding passage 181 is sent forward by the platen roller 57 depending on results of the detection of the sensor 183 whereby printing is started from one end of the stamp character label Bd. One of walls defining the delivery passage 182 on a left-hand side as viewed in FIG. 2 is formed with a separating nail 184 at an upstream end thereof, whereby the ink ribbon C and the plate-making sheet B being fed, one upon the other, are separated from each other. Thereafter, the ink ribbon C is sent forward to the exposure block, while the plate-making sheet B is delivered via the delivery passage 182 out of the apparatus.

Next, the exposure block 65 provided will be described with reference to FIGS. 2 and 11. The exposure block 65 includes a light source-driving circuit 191*a* connected to the output interface 305 of the control block 300, an ultraviolet ray source 191 arranged in a manner opposed to the stamp surface Ad of the stamp body A set in the pocket 6 and driven by the light source-driving circuit 191*a*, and a presser plate 58 arranged between the ultraviolet ray source 191 and the stamp surface Ad of the stamp body A. The ultraviolet ray source 191 is a self-heating hot-cathode tube called a semi-hot tube and supported on a fluorescent tube holder, not shown, provided on a base plate, not shown. The stamp surface Ad of the stamp body A, the presser plate 58, and the ultraviolet ray source 191 are arranged in a manner parallel to each other with a gap between adjacent ones thereof. The ink ribbon C is fed between the stamp surface Ad and the presser plate 58.

The presser plate 58 is formed e.g. of a transparent resin, and moves forward (downward as viewed in FIG. 2) to urge the ink ribbon C against the stamp surface Ad of the stamp body A. More specifically, the exposure is carried out by causing the presser plate 58 to urge the ink ribbon C against the stamp surface Ad of the stamp body A, and lighting the ultraviolet ray source 191 to thereby irradiate light to the ink ribbon C through the presser plate 58 (see FIG. 5). The exposure block 65 is provided with an ambient temperature sensor 67 formed by a thermistor or the like which is connected to the input interface 304 of the control block 300, and sends information of a temperature of ambience of the exposure block 65 detected thereby to the input interface 304.

It should be noted that as the presser plate 58 is translated forward, the first guide pin 53 and the second guide pin 54 are moved in the same direction. This movement decreases the tension of the ink ribbon C stretched between the first and second guide pins 53, 54, whereby the ink ribbon C is urged against the stamp surface Ad of the stamp body A with reduced tension, i.e. without forming any vertical wrinkles thereon.

Now, the above-mentioned state of the ink ribbon C is described in further detail with reference to FIGS. 2 and 5. Referring to FIG. 2, when the ink ribbon C is fed or advanced, the pulling force of the take-up reel 13 causes strong tension of the ink ribbon C, so that vertical wrinkles are formed on the ink ribbon C due to its very small thickness. Therefore, if the ink ribbon C is urged against the stamp surface Ad of the stamp body A as it is, there remain the wrinkles formed on the ink ribbon C urged against the stamp surface Ad, so that deformed images (negative) of the stamp characters on the ink ribbon C are used in carrying out the exposure of the stamp surface Ad to the ultraviolet rays. On the other hand, if the ink ribbon C is loosened, the exposure can be carried out with the images of the stamp characters being out of position. To eliminate these inconveniences, as shown in FIG. 5, the first guide pin 53 and the second guide pin 54 are moved forward in accordance with the forward movement of the presser plate 58, whereby the tension of the ink ribbon C is reduced, and at the same time, a slight stretching force is applied to the ink ribbon C by the tension pin 55, which is moderate enough not to produce any wrinkles on the ink ribbon C.

Figure 5:
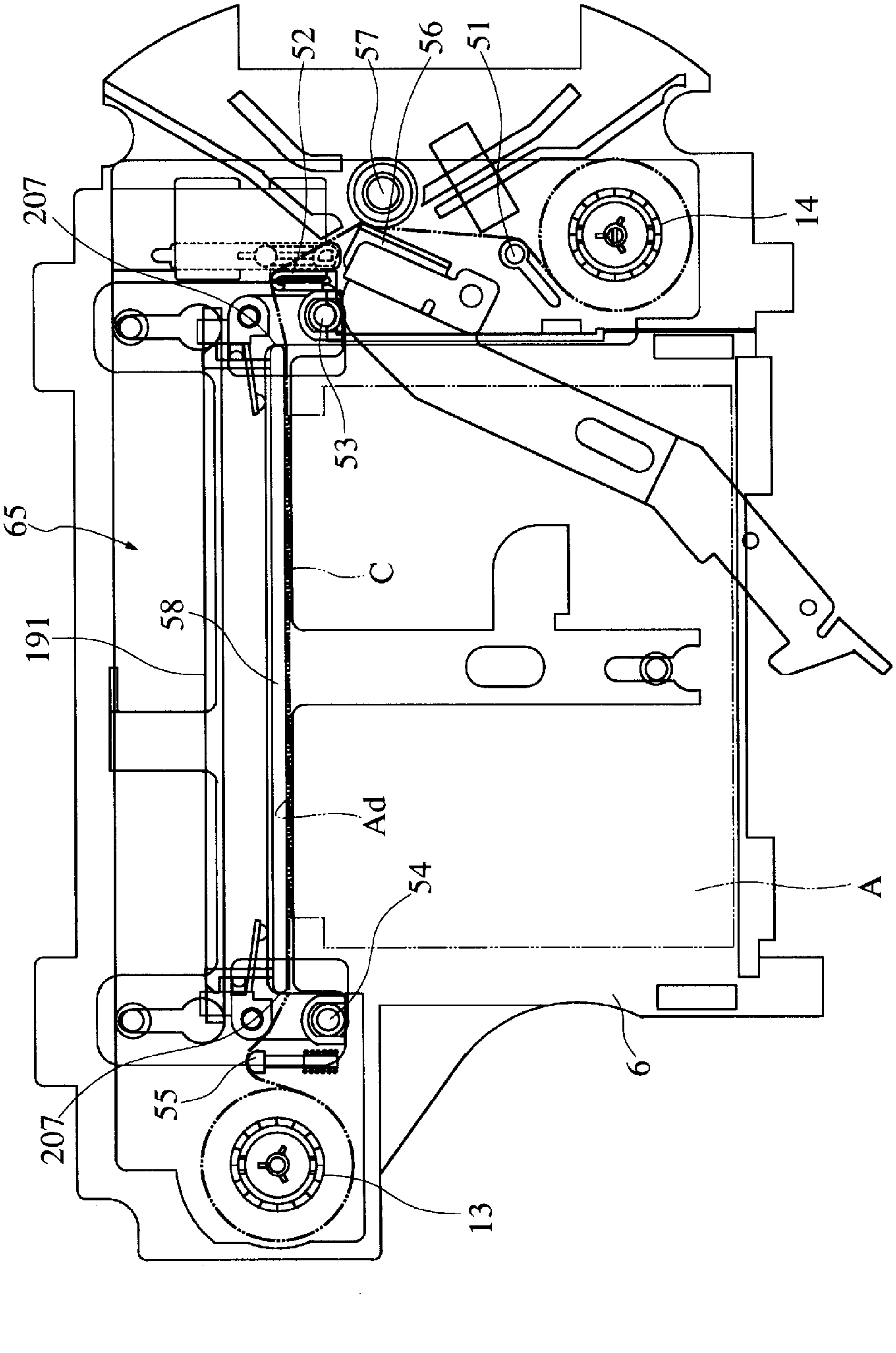
FIG. 5 is a plan view of an exposure system of the mechanical block and component parts associated therewith.
Figure 6:
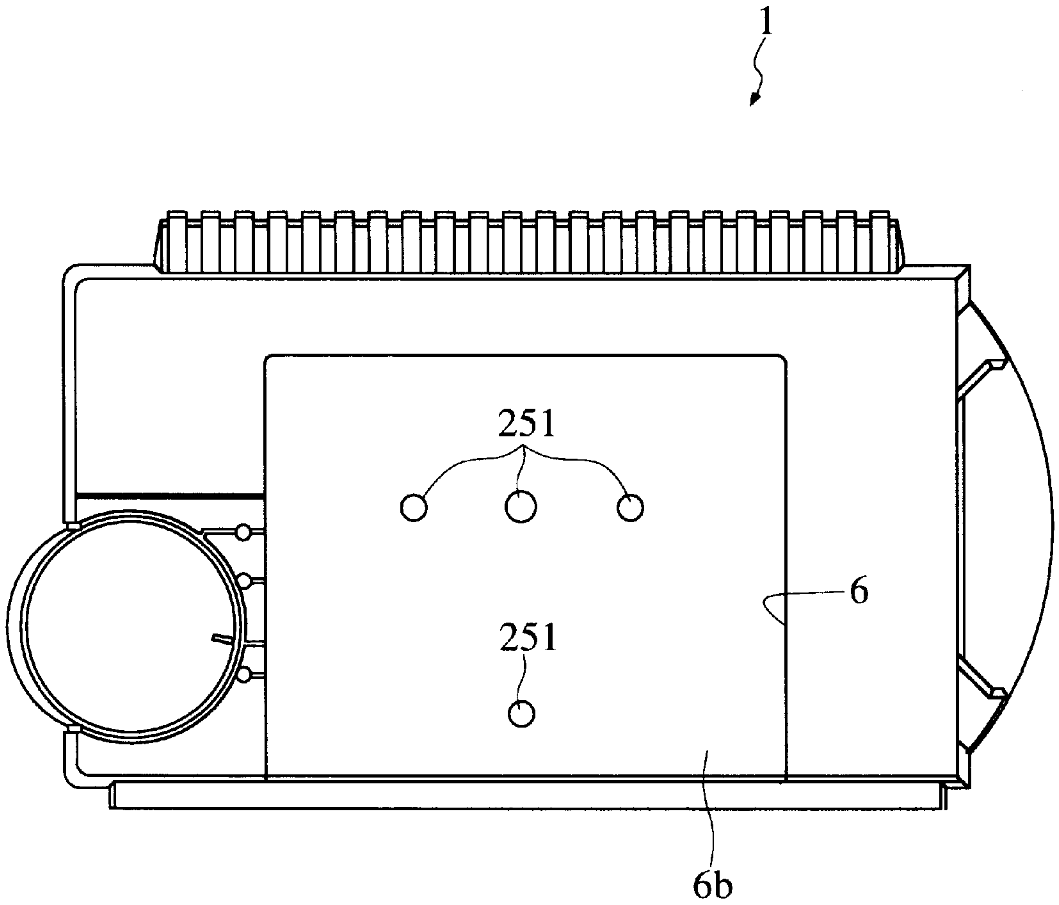
FIG. 6 is a plan view of a pocket from which a lid is removed and component parts associated with the pocket.

Further, the ink ribbon C in the exposure position shown in FIG. 5 is bent backward at the longitudinal opposite ends of the presser plate 58 by the tension pin 55 and the second path-setting pin 52, and the chamfered portions 207 formed at the longitudinal opposite ends of the presser plate 58 operate to prevent undesired wrinkles from being produced on the ink ribbon C.

As described above, a positive image on the plate-making sheet B and a negative image on the ink ribbon C both formed by the printing are used as a stamp character label and an exposure mask, respectively. That is, the quality of these images directly reflects on the quality of a stamp as a final product. Especially, when the ink ribbon C, which is used as the exposure mask, is deformed, images of deformed characters are formed on the stamp body by the exposure. To eliminate this inconvenience, in addition to mechanical structural means for regulating the tension of the ink ribbon described above, electrical means of adjusting an amount of heat generated by the exposure process is provided to thereby preventing undesired wrinkles from being formed on the ink ribbon C.

Next, the stamp-detecting block 66, the operation of which is linked to the opening and closing of the lid 7, will be described. The stamp-detecting block 66 detects the mounting of the stamp body A in the pocket 6, and at the same time discriminates the type of the mounted stamp body A. The stamp body A includes various types having respective different shapes, e.g. ones for a square stamp, a personal name stamp, a business stamp, an address stamp, etc. The different types of stamp bodies A for respective types of stamps are identical in length, but different in width and thickness. It should be noted that the above "length" means a size of the stamp body A between the stamp surface Ad and a surface on an opposite side thereto (back surface Ag), the above "width" means a size of the stamp body A between surfaces of opposite lateral ends thereof in its position mounted in the pocket 6, and the above "thickness" means a size of the stamp body between an upper side surface and a lower side surface of the stamp body in its position mounted in the pocket 6. To set each of these various types of the stamp body A different in width and thickness to a fixed position with respect to the directions along the width and the thickness of the stamp body A, in the present embodiment, as shown in FIGS. 6 and 7A to 7D, four bosses 251, 251, 251, 251, long and short, are provided on the bottom 6b of the pocket 6 such that they extend perpendicularly upward from the bottom, and the stamp body A is formed with fitting holes Af for fitting corresponding ones of the bosses therein, respectively.

Figure 7A:
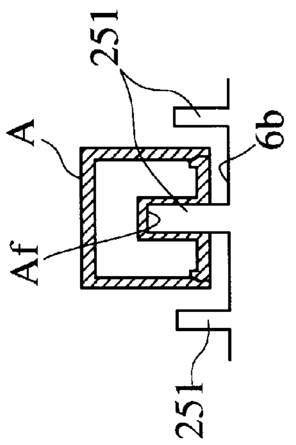
Figure 7B:
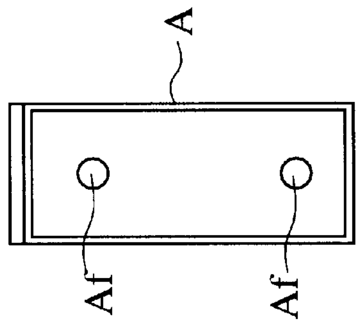
Figure 7C:
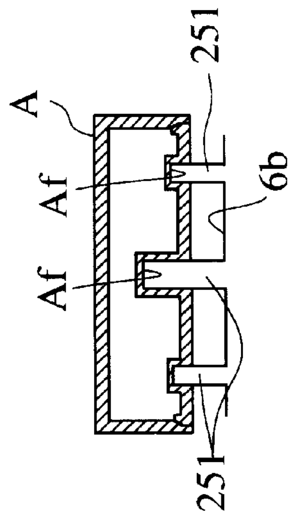
Figure 7D:
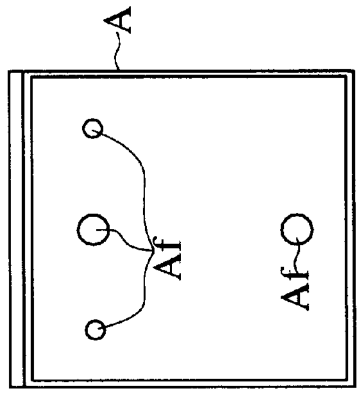
Figure 8A:
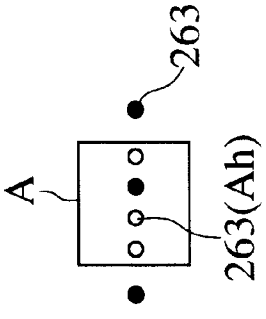
FIG. 8A is a diagram showing a pattern for discriminating a stamp body of a small square stamp.
Figure 8B:
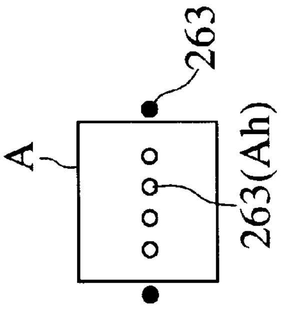
FIG. 8B is a diagram showing a pattern for discriminating a stamp body of a large square stamp.
Figure 8C:
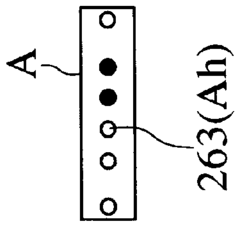
FIG. 8C is a diagram showing a pattern for discriminating a stamp body of a personal name stamp.
Figure 8D:
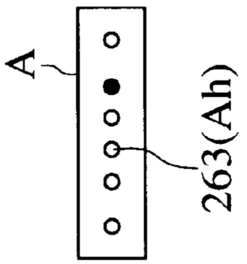
FIG. 8D is a diagram showing a pattern for discriminating a stamp body of a small business stamp.
Figure 8E:
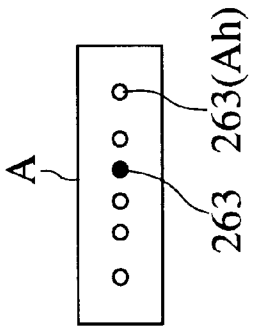
FIG. 8E is a diagram showing a pattern for discriminating a stamp body of a large business stamp.
Figure 8F:
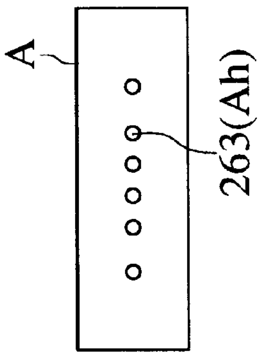
FIG. 8F is a diagram showing a pattern for discriminating a stamp body of an address stamp.
Figure 8G:
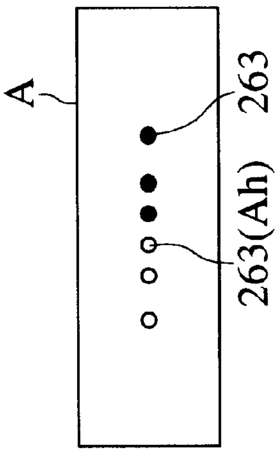
FIG. 8G is a diagram showing a pattern for discriminating a maximum size stamp body.

The four bosses 251, 251, 251, 251 are arranged to form a T shape, and in a manner corresponding thereto, a stamp body A for the square stamp, for example, is formed with two fitting holes Af, Af (see FIGS. 7A and 7B), and a stamp body A for the business stamp, for example, is formed with four fitting holes Af, Af, Af, Af (see FIGS. 7C and 7D). The number of the fitting holes Af and the depth of each of them depend on the type of the stamp body A, and this combination of the fitting holes Ag and the bosses 251 enables each stamp body A to be mounted in the pocket 6 such that the center of the stamp surface Ad of the stamp body A mounted in the pocket 6 is positioned to a fixed location.

Further, the back surface Ag on the opposite side to the stamp surface Ad is formed with a plurality of small holes Ah (type-detecting holes) arranged side by side at respective central locations along the width of the stamp body A. The small holes Ah cooperate with a switch array 262 of the stamp-detecting block 66, described hereinafter, to detect the type of the stamp body A (see FIGS. 8A to 8G) The stamp character label Bd of the plate-making sheet B printed with stamp characters and delivered to the outside of the apparatus separately from the ink ribbon C is affixed to the back surface Ag of the stamp body A, whereby the small holes Ah are concealed.

Figure 9:
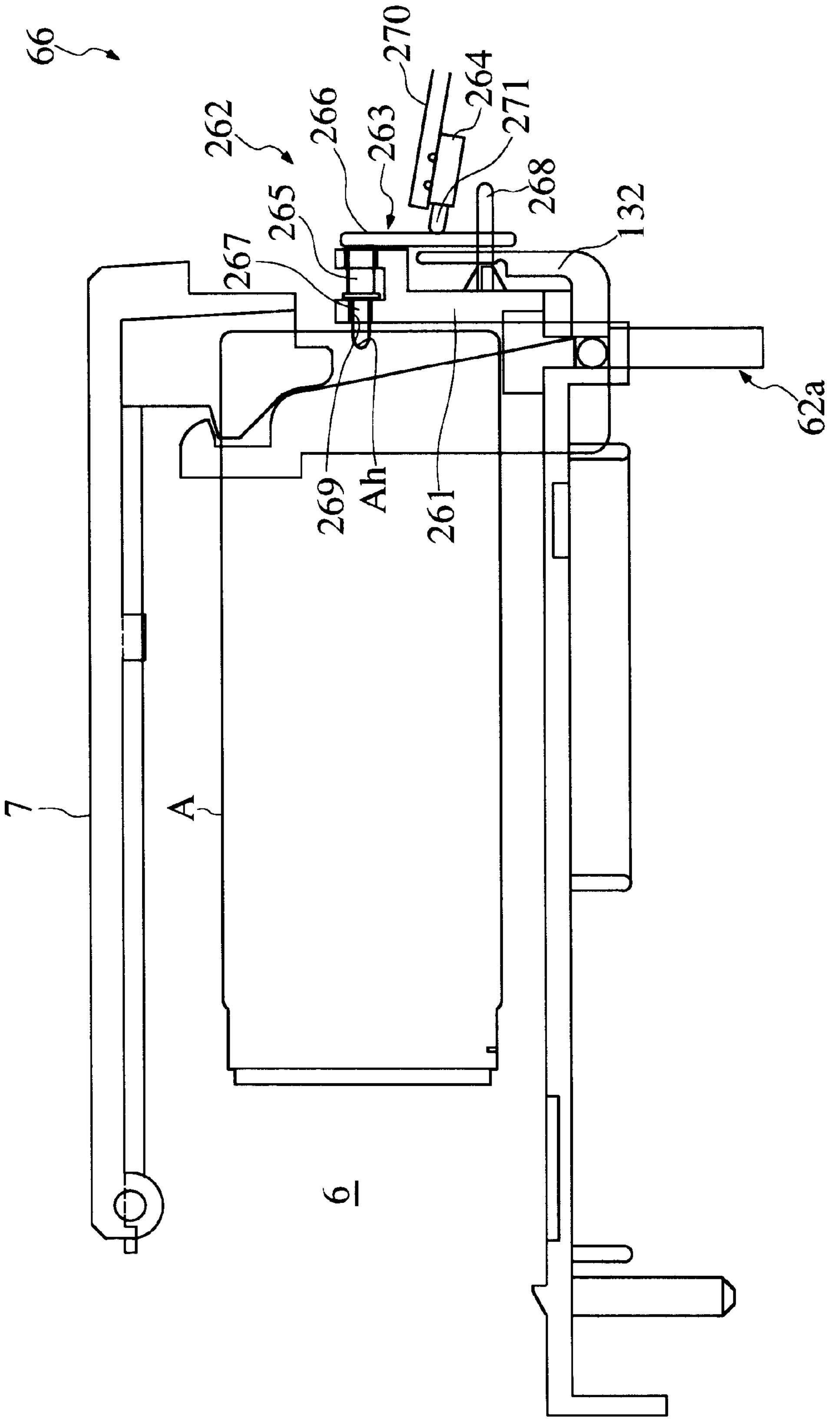
FIG. 9 is a cross-sectional view which is useful in explaining operations of a stamp-detecting block for detecting a stamp.
Figure 10:
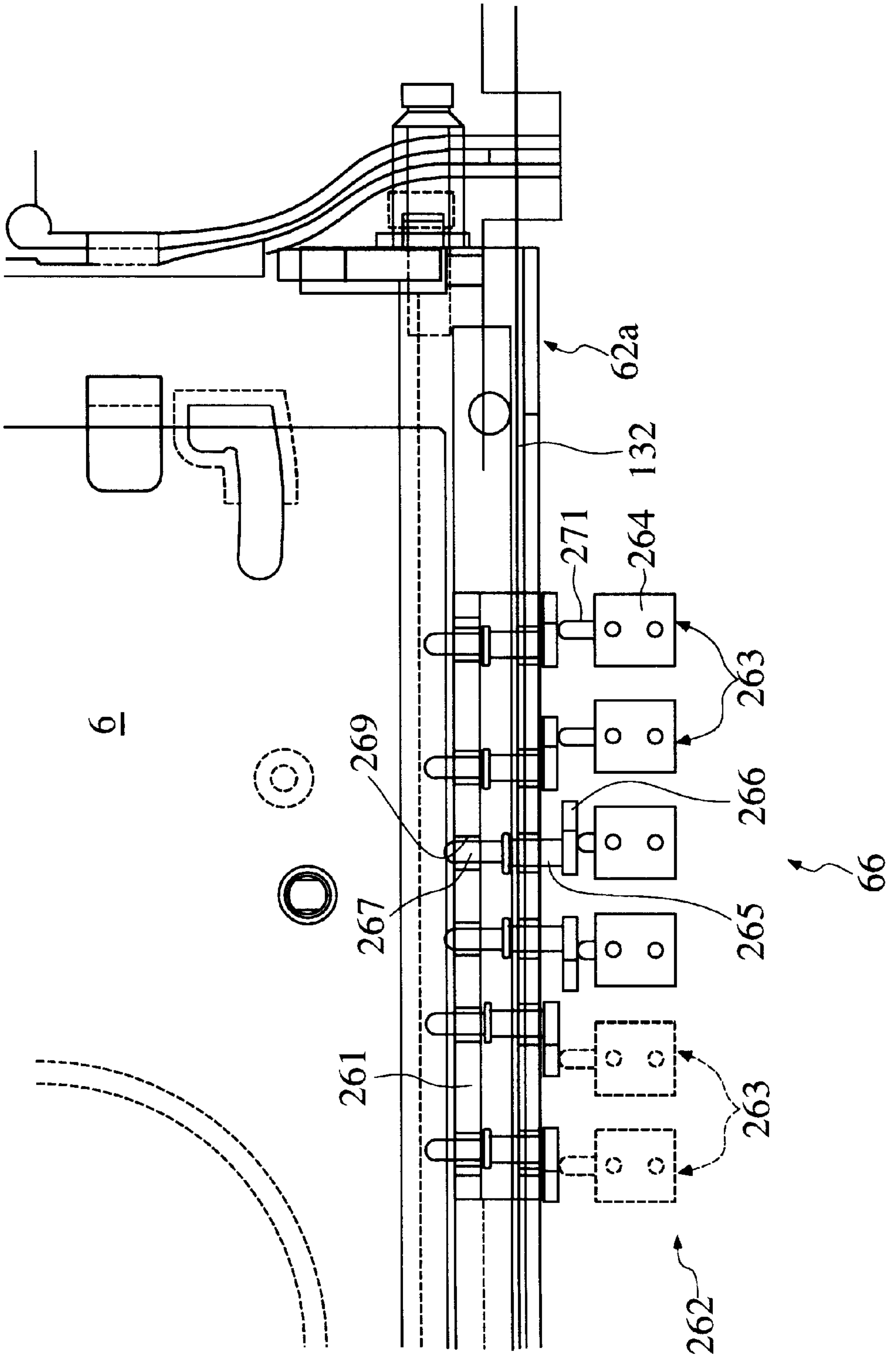
FIG. 10 is a partial plan view of the pocket, the stamp-detecting block and component parts associated therewith.

As shown in FIGS. 9 and 10, the stamp-detecting block 66 includes a switch holder 261 (also serving as a wall of the pocket 6) arranged such that it is opposed to the back surface Ag of the stamp body A when it is mounted in the pocket 6, and the switch array 262 formed of six detecting switches 263 supported on the switch holder 261. Each detecting switch 263 is comprised of a switch body 264 formed e.g. of a push switch, and a switch top 265 having one end for being projected into the pocket 6. The switch top 265 includes a plate portion 266 and a detecting projection 267 (including the one end) extending at a right angle to the plate portion 266, with a lower part of the plate portion 266 being guided by a guide projection 268 formed in the switch holder 261 and the detecting projection 267 being guided by a guide hole 269 formed through the switch holder 261 for forward and backward motions thereof.

The switch body 264 is fixed to the reverse side surface of a base plate 270 such that a plunger 271 thereof abuts the plate portion 266 of the switch top 265. The plunger 271 urges the switch top 265 toward the pocket 6 by the urging force generated by its spring, not shown. A state of the one end of the detecting projection 267 projected into the pocket 6 via the guide hole 269 through the switch holder 261, and a state of the same being retracted against the urging force of the plunger 271 correspond to ON-OFF states of the detecting switch 263, respectively. Actually, when any of the detecting switches 263 of the switch array 262 is turned on, mounting of the stamp body A is detected, whereas when all of the detecting switches 263 are turned off, removal of the stamp body A is detected. The detecting switches 263 of the switch array 262 are each in ON or OFF state depending on whether a corresponding small hole Ah exists in the stamp body A. Therefore, the type of the stamp body A can be determined from a pattern of ON/OFF states of the six detecting switches 263.

FIGS. 8A to 8G show the relationship between small holes Ah in the stamp body A and the six detecting switches 263 (detecting projections 267). Provision of the six detecting switches 263 for detecting presence or absence of the small holes Ah makes it possible to detect $2^6-1$, i.e. 63 types of patterns. A stamp body A for a square stamp or the like, which is small in width, has no small holes Ah corresponding to two outermost detecting switches 263, 263 on respective opposite sides, and the two detecting switches 263, 263 project into space at opposite locations outside the stamp body A. That is, a stamp body A having a small width, such as a stamp body A for a square stamp, is recognized by a pattern for a stamp body A having imaginary small holes Ah at outermost locations thereof.

Next, the control block 300 will be described with reference to FIG. 11. The control block 300 is formed e.g. by a microcomputer, and includes a CPU 301, a ROM 302, an input interface 304, an output interface 305, and a system bus 306 connecting all these devices to each other.

The ROM 302 stores various programs, dictionary data for kana-kanji character conversion, font data of characters, symbols, etc. and fixed data, such as data of a predetermined stamp frame. The RAM 303 is used as a working area, and also as means for storing fixed data input by a user. The data stored in the RAM 303 is backed-up even when the power is turned off.

The input interface 304 interfaces to take in signals from the function switch 8, the push button group 22 and the operating dial 23 of the operating block 21, the head surface temperature sensor 56*b* of the printing block 64, the ambient temperature sensor 67 of the exposure block 65, and the stamp-detecting block 66, via the system bus 306 into the CPU 301 or the RAM. The output interface 305 interfaces to deliver control signals and data for use in control operations, which are received via the system bus 306 from the CFU 301, the ROM 302, and the RAM 303, to the light-emitting elements 12, a beeper 333, the display-driving circuit 24*a* of the operating block 21, the head-driving circuit 56*a* of the printing block 64, the motor-driving circuit 57*a*, the light source-driving circuit 191*a* of the exposure block 65, etc.

The CPU 301 carries out processing based on input signals from the input interface 304, and a processing program stored within the ROM 302 and selected according to the processing on each occasion, using the RAM 303 as the working area, and fixed data stored within the ROM 302 and the RAM 303, as needed.

Figure 12:
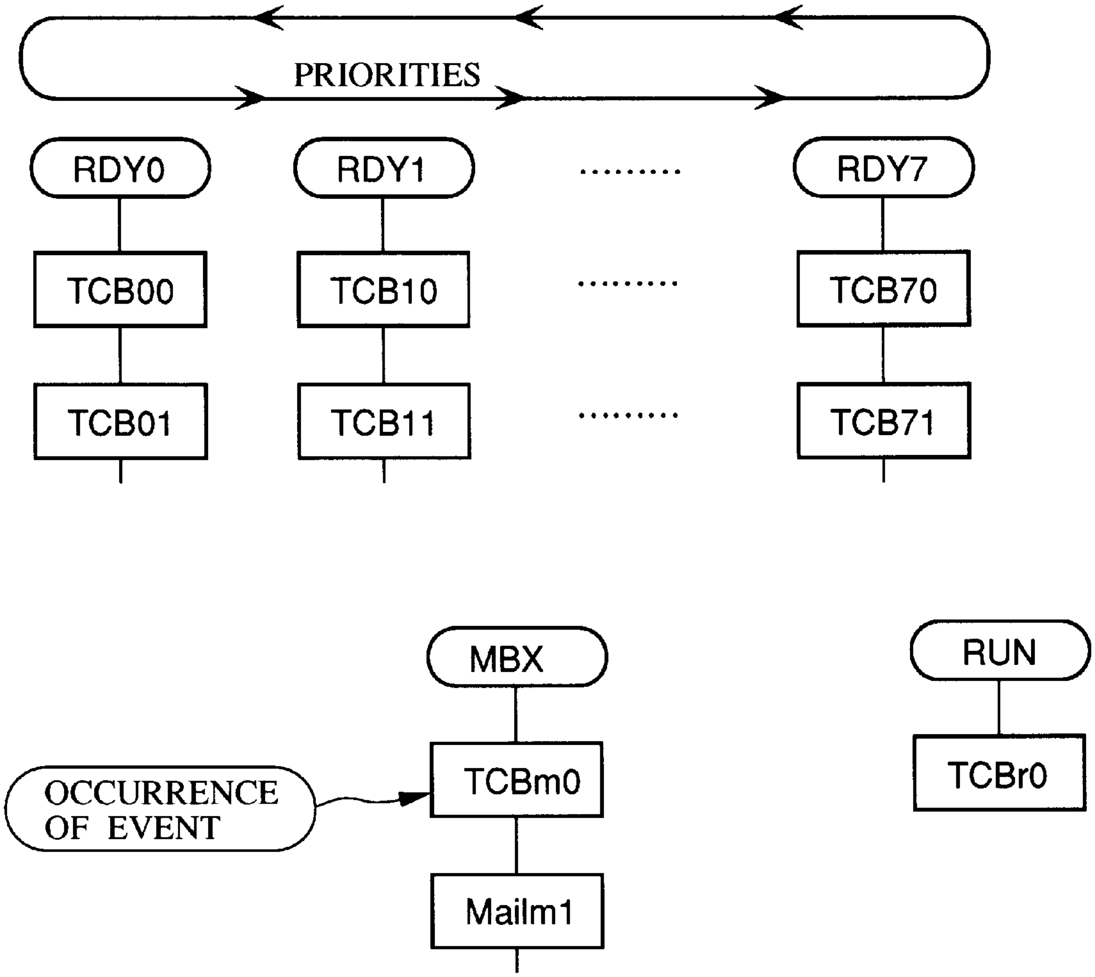
FIG. 12 is a conceptual representation of an outline of multitasking by the stamp-making apparatus.

The stamp-making apparatus 1 of the present embodiment carries out multitask processing in the following manner:

FIG. 12 shows a conceptual representation of the multitasking of the present embodiment. A plurality of tasks to be executed are classified into groups having respective priorities RDY0 to RDYn (in the case of the illustrated example, n=7), and the order of processing of tasks is determined based on the priorities to thereby activates each task. In the following description, tasks assigned the highest priority RDY0 are designated as TCB0i (i=0, 1, 2, . . . ), and tasks assigned the lowest priority are designated as TCB7i. In general, a task assigned the priority RDYj (j=0 to 7) is designated as TCBji. Further, when a task is classified into a group having the priority RDYj, and placed in a wait state in this group, i.e. in the priority, this state will be described e.g. as "a task TCBm0 is registered as TCBj0". When one or more tasks assigned the priority RDYj are registered, it will be expressed as "task existing in RDYj".

Further, as shown in FIG. 12, in the multitasking, an area is set aside for registering a name of each task (e.g. TCBm0 shown in the figure) created for execution in response to an event, such as an interrupt, generated e.g. by depression of any of the push buttons of the push button group 22 or operation of the operating dial 23, and registering a communication task between tasks (e.g. Mailm1 shown in the figure; hereinafter simply referred to as a "mail"). This area will be referred to as "mail box MBX" in the following description. Further, the name of a task representative of the contents of current or actual processing is expressed as TCBr0, and execution of this task for processing is expressed as "the active task run processing", or "the RUN processing" in an abbreviated form. For example, when a task TCB00 is selected and activated, it will be expressed as "the task TCB00 is registered as TCBr0 and activated". This registration is shown as "TCBr0←TCB00" in hierarchical operation diagrams, referred to hereinafter, and flowcharts. The task TCBm0 in the mailbox MBX contains information concerning whether the task TCBr0 currently being executed should be forcedly interrupted or not, and which priority RDYi it should be registered in, and in MBX processing, referred to hereinafter, the task TCBm0 is executed according to these pieces of information.

Figure 13:
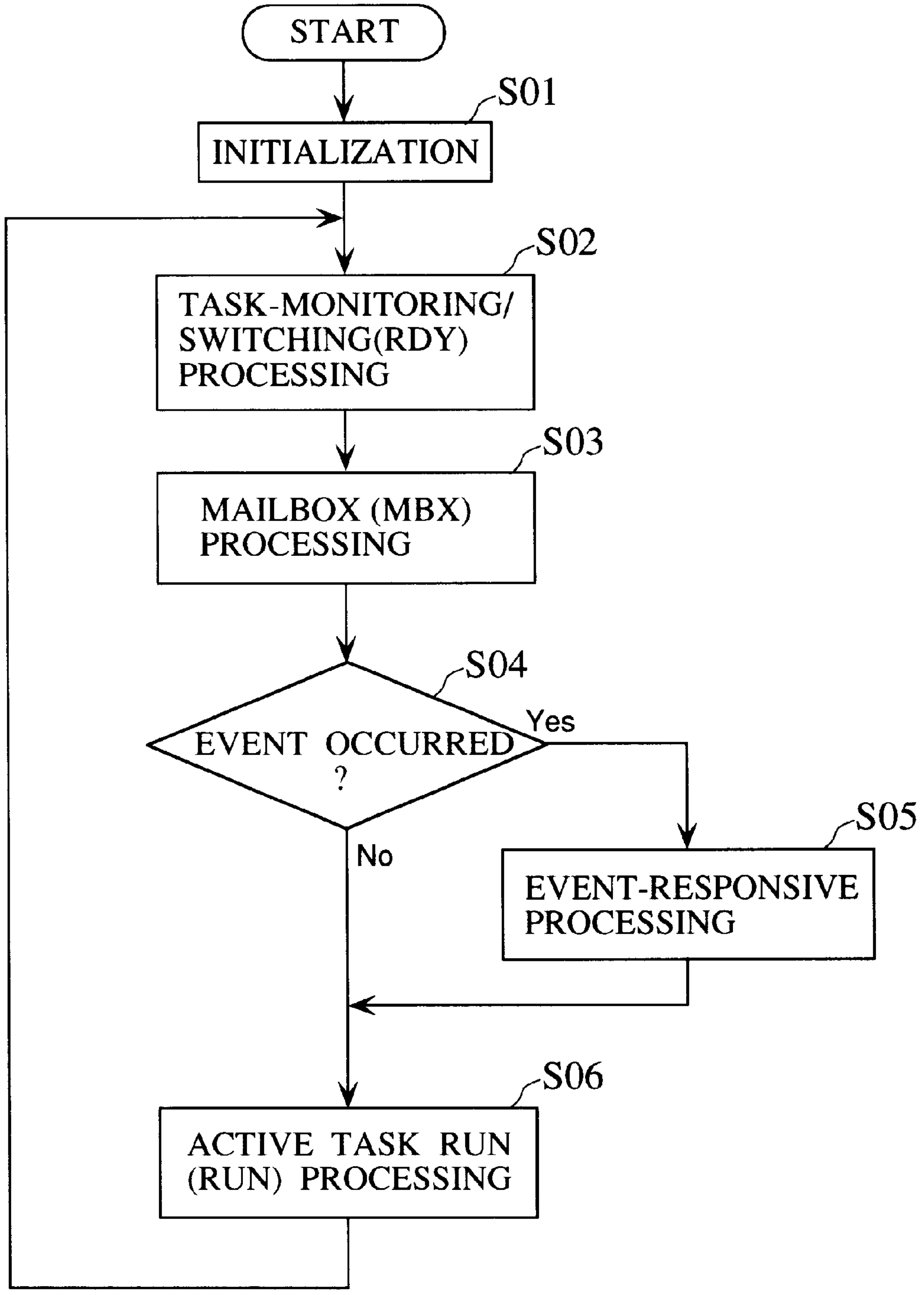
FIG. 13 is a flowchart showing an outline of the overall processing of the stamp-making apparatus.

FIG. 13 shows a procedure of processing executed according to the stamp-making method of the present embodiment, expressed in the form of an ordinary flowchart. As shown in the figure, when the power is turned on to start the processing, first an initialization of each device of the stamp-making apparatus is executed at a step S01, task-monitoring/switching (RDY) processing at a step S02, and mailbox (MBX) processing at a step S03. Then, it is determined at a step S04 whether or not any event has occurred. If an event has occurred, event-responsive processing is executed at a step S05, and thereafter, the active task run (RUN) processing is executed at a step S06. Then, the RDY processing (the step S02) to the RUN processing (the step S06) are repeatedly executed.

However, in the actual processing, the RDY processing and the MBX processing are executed only at predetermined regular timing, but event-responsive processing is started upon occurrence of the event, while the RUN processing is executed during execution of the other processing. Therefore, the present multitasking cannot be expressed accurate enough by the above flowchart, and the hierarchical structure of the program is difficult to understand therefrom. Therefore, in the following description, when a sequence of steps of a task is described, a flowchart is employed which shows a task actually executed by activating another task for the multitasking is shown as a subroutine. Event-driven type tasks, i.e. tasks which are initiated or activated in response to respective events, are described by a description method used in a diagram of FIG. 14 (hereinafter referred to as "the hierarchical operation diagram").

Figure 14:
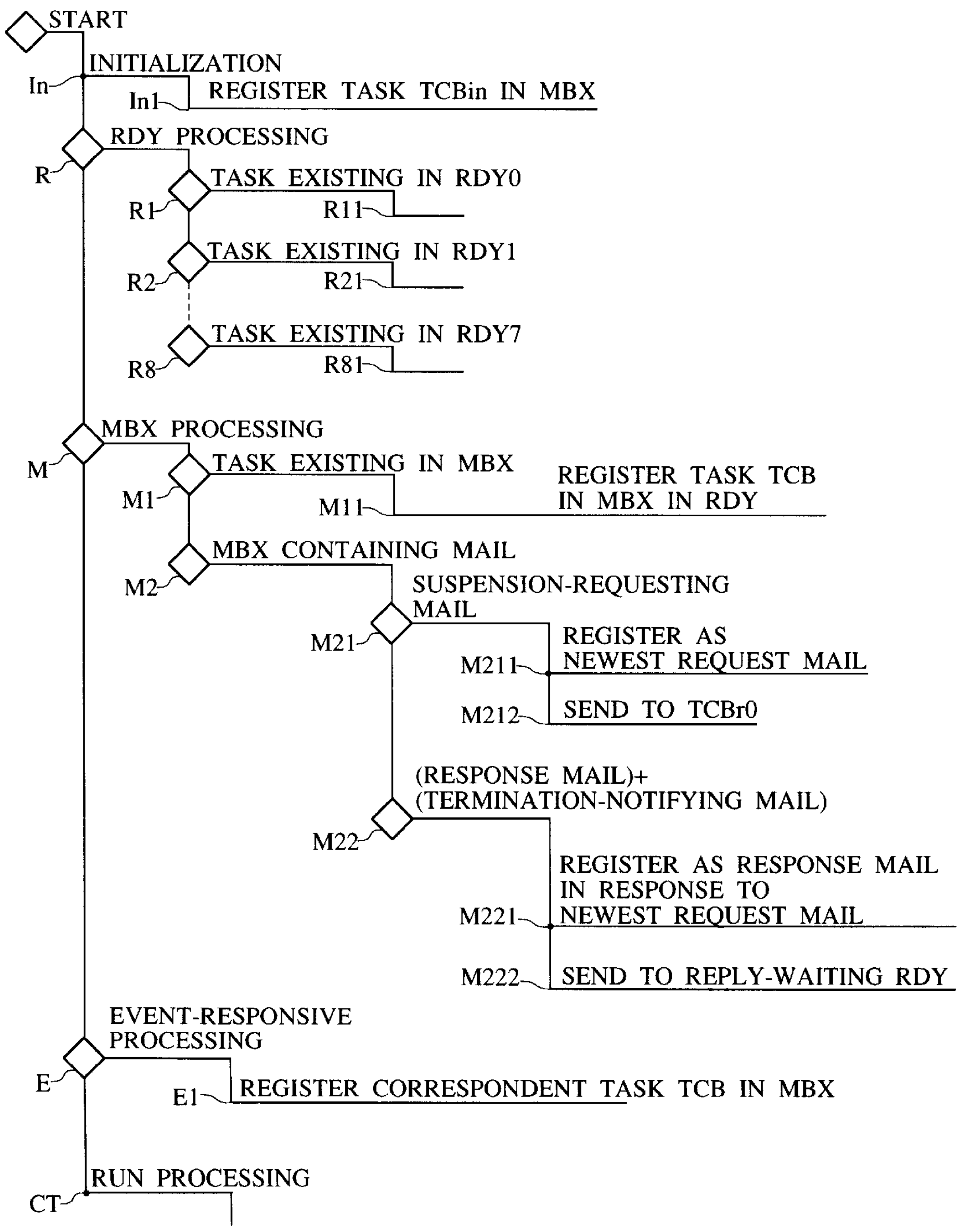
FIG. 14 is a hierarchical operation diagram showing major operations carried out by the stamp-making apparatus.

In the hierarchical operation diagram, each processing branch point designated by symbol ◇ shows a task, a program, or a subroutine, which is of an event-driven type i.e. executed when an event, such as an interrupt or activation of a task by another task, has occurred. The task-monitoring/switching (RDY) processing shown in FIG. 14 is started only when an interrupt is generated at regular time intervals e.g. through a real time monitoring. Further, the mailbox (MBX) processing is also started by an interrupt generated at regular time intervals other than the regular time intervals of the PDY processing. The event-responsive processing registers various events, such as tasks initiated by operations of the operating dial 23, in the mailbox MBX. Although only one routine is shown in FIG.14 as a representative, actually, the mailbox MBX is accessed for registration of the name of a task to be executed in response to each event independently whenever the event occurs.

As shown in FIG. 14, when the program is started by turning on the power, first, the initialization at a processing branch point In (hereinafter referred to as "the initialization (In)") is executed. The initialization (In) registers a task TCBin of main tasks-starting processing in the mailbox MBX (In1). When the initialization (In) is terminated, if it is neither time for the RDY processing nor time for the MBX processing, or any other event has not occurred, then the program proceeds to the RUN processing (CT). However, at this time point of the present case, there is no task registered, so that time for starting the RDY processing or the MBX processing is awaited.

In this state, when it becomes time for the RDY processing, the RDY processing (R) is executed, but there are no tasks registered in the priorities RDY0 to RDY7, i.e. no tasks exist in the priorities RDY0 to RDY7 (R1 to R8), so that the RDY processing is terminated without executing any specific processing. On the other hand, when it is time for the MBX processing, the MBX processing (M) is executed, and according to the task TCBin for starting main tasks, which has been registered as TCBm0 in the mailbox MBX, the processing of "task existing in MBX (M1)" is executed to register the task TCB of the mailbox MBX in the priority RDY. That is, if the priority specified for the task TCBin corresponds to the priority RDY4, the task TCBin is registered as TCB40 in the priority RDY4.

Figure 15:
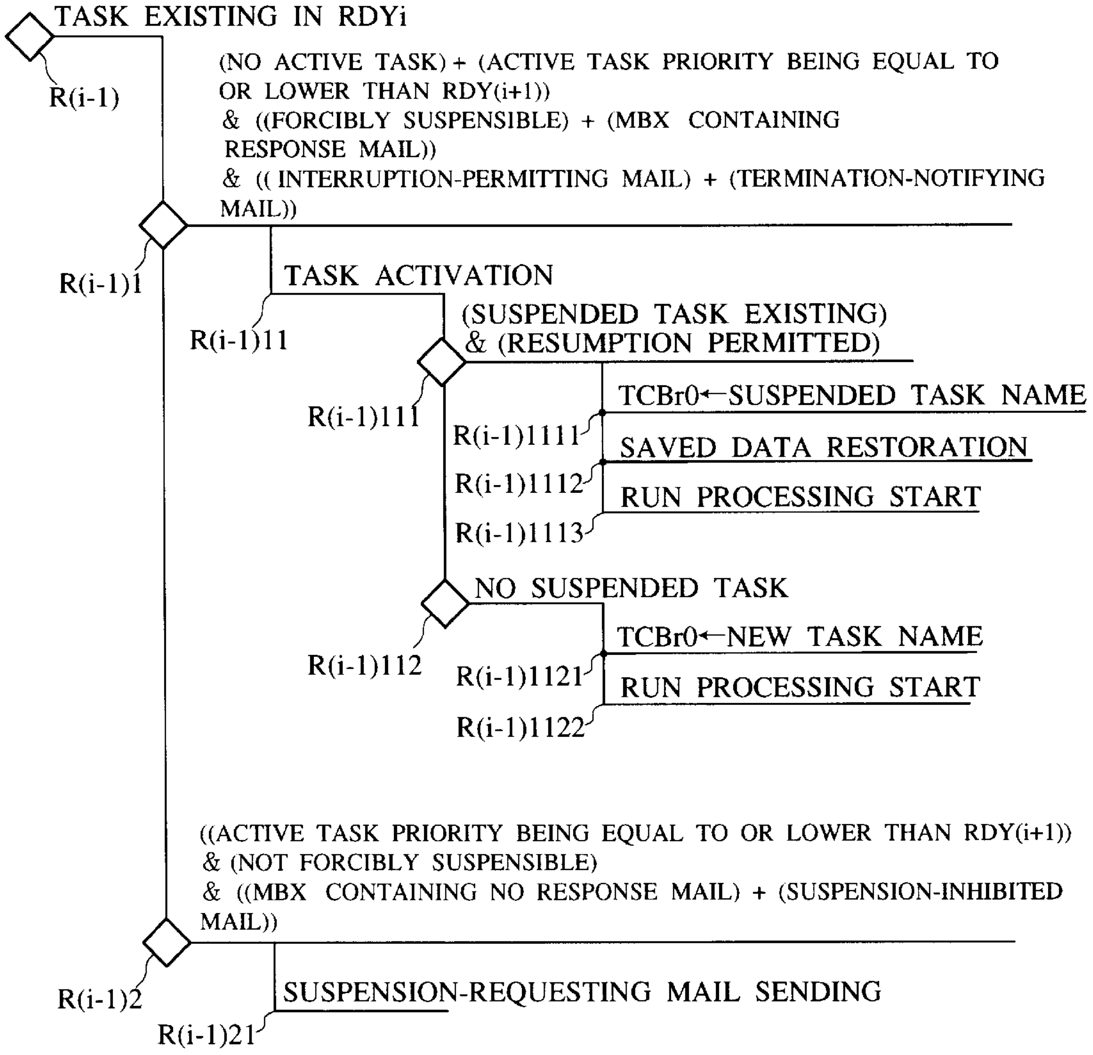
FIG. 15 is a hierarchical operation diagram of task-monitoring/switching processing executed by the stamp-making apparatus.

In this state, when it is time for the RDY processing, the RDY processing (R), e.g. the processing of "task existing in RDY4 (R3)" is executed. Now, the processing of "task existing in RDYi (R(i−1))" will be described with reference to FIG. 15. This processing largely branches into a case of activating a new task (or a suspended task), a case of sending a suspension-requesting mail to the active task, a case of executing no processing.

First, if there is no active task, i.e. if there is no task registered as TCBr0, and hence the RUN processing is not being executed, or if the active task TCBr0 has a priority equal to or lower than the priority RDY(i+1), and at the same time, the active task is suspensible, another task is stated. The term "suspensible" means that the task to be activated can forcibly interrupt execution of the active task, or that a response mail in response to the suspension-requesting mail is an interruption-permitting mail or a termination-notifying mail indicative of termination of the active task. Under the above-mentioned condition, i.e. when the conditions of (no active task)+(active task priority being equal to or lower than RDY(i+1)) & ((forcibly suspensible)+(MBX containing response mail) & ((interruption-permitting mail)+(termination-notifying mail)) are fulfilled at R(i−1)1, the new task starts to be activated at R(i−1)11. Here, "+" represents a logical sum, while "&" a logical product.

On the other hand, a suspension-requesting mail is sent to the mailbox MBX, if the priority of the active task is equal to or lower than RDY(i+1), and at the same time there is no response mail from the active task so that it is not known whether the active task is suspensible or not, or the situation requires resending of the suspension-requesting mail after a response mail saying that the active task is not suspensible was received in response to the preceding suspension-requesting mail. That is, if the conditions of (active task priority being equal to or lower than RDY(i+1) & (not forcibly suspensible) & ((MBX containing no response mail)+(suspension-inhibited mail)) are fulfilled at R(i−1)2, a suspension-requesting mail is sent at R(i−1)21. If neither of the above two sets of conditions are fulfilled, i.e. if the active task priority is equal to or higher than RDYi, no particular processing is executed, but the processing of "task existing in RDYi (R(i−1))" is terminated.

In the task activation (R(i−1)11), if there exists any other task which has been suspended to activate a task higher in priority, or to start a subtask and wait for results of processing by the subtask, it is determined e.g. from resumption information, referred to hereinafter, whether the suspended task can be resumed or not. If the suspended task can be resumed, the processing of (suspended task existing) & (resumption permitted) (R(i−1)111) is executed. In this processing, the suspended task is registered as the active task TCBr0 at R(i−1)111, and if there are any saved data or the like, these data are restored or returned at R(i−1)1112, followed by newly starting the RUN processing at R(i−1)1113. According to generation of this event, task (CT1) is activated in the RUN processing (CT), referred to hereinafter.

When there is no suspended task, the processing of "no suspended task" is executed at R(i−1)112, and after the processing of "TCBr0← new task name" is executed at R(i−1)1112, the RUN processing is started again at R(i−1)1122. For example, when the task TCBin for activating the main tasks is to be executed, in the processing of task activation (R311), the processing of "TCBr0←TCBin (R31121)" is executed in "no suspended task (R3112)", and then the RUN processing is started at R31122.

On the other hand, if there is a suspended task but the resumption of the suspended task is inhibited, the permission of resuming the suspended work has to be awaited, so that the task activation (R(i−1)11) is terminated without executing any processing. It should be noted that since the above-mentioned subtask is normally set to a higher priority than the originating task, generally, the subtask has already been terminated, permitting the originating task to be resumed when the task initiation (R(i−1)11) is processed.

Next, the mailbox (MBX) processing will be described with reference to FIG. 14. In this processing, in the case of "task existing in MBX (M1)", the task TCBm0 in the mailbox MBX is registered at M11 in a priority RDYj according to a priority specified for the task. In the case of "MBX containing mail (M2)", if the mail is a suspension-requesting mail (M21), it is registered as a newest request mail at M211, and sent to the active task TCBr0 at M212, whereas if the mail fulfills the conditions of "(response mail)+(termination-notifying mail)" at M22, it is registered as a response mail in response to the newest request mail (at M221) and sent to a reply-waiting RDY (at M222).

Next, the event-responsive processing (E) will be described. Although the initialization (In) is described as a different kind of processing from this processing for the convenience of explanation, it is actually a kind of event-responsive processing (E). That is, the event-responsive processing (E) registers a task created by an event from the outside of the CPU, such as a manipulation of the operating dial 23, or a task created for execution of a program for internal processing, in the mailbox MBX at E1. For example, after registration in the mailbox MBX, the task TCBin for starting the main tasks is registered in the priority RDY, and then executed as a new task by the (RUN) processing described below.

Figure 16:
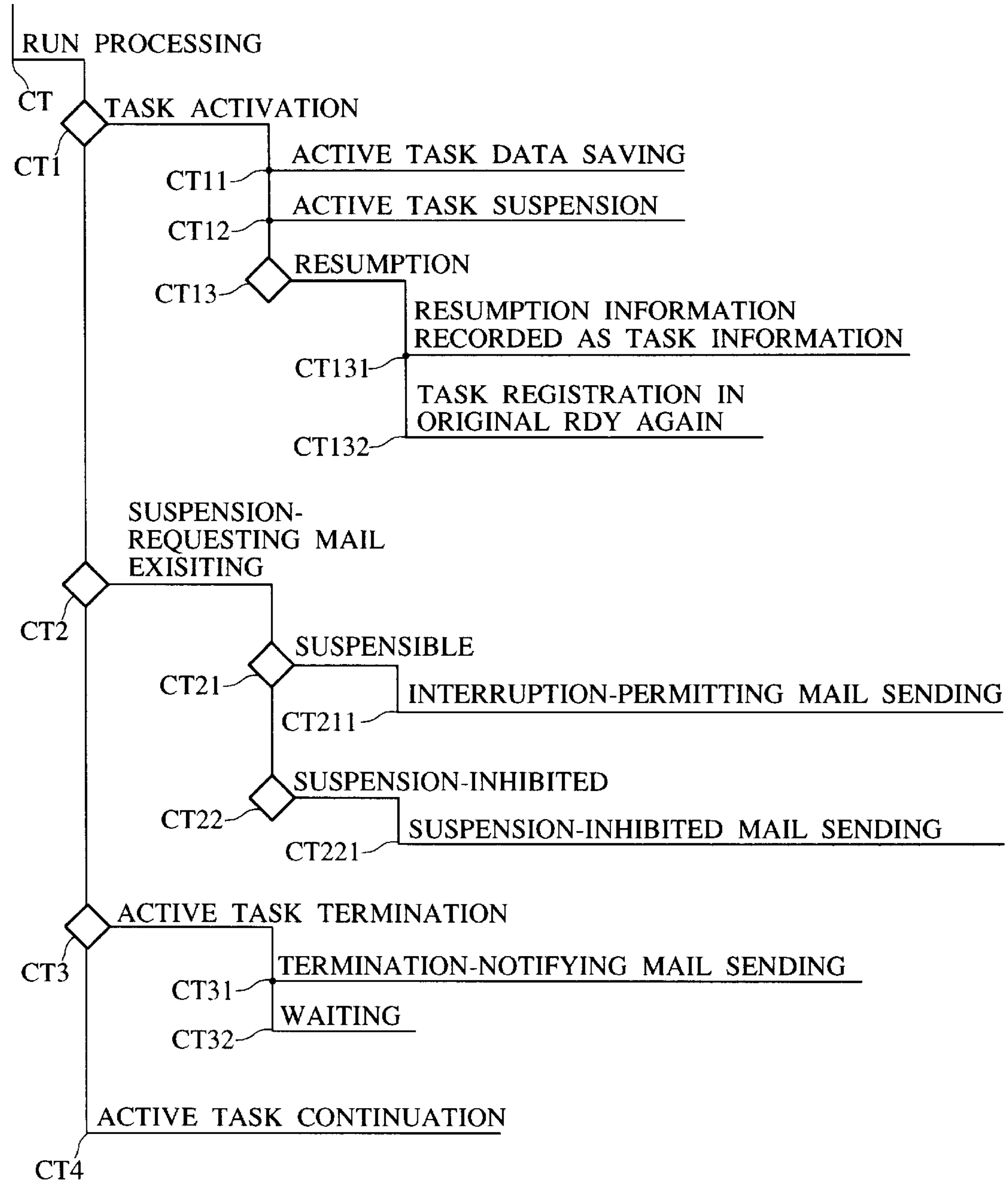
FIG. 16 is a hierarchical operation diagram of active task-executing processing executed by the stamp-making apparatus.

Now, the active task run (RUN) processing (CT) will be described with reference to FIG. 16. This processing continues the active task TCBr0 when there is no other event generated as described above. During this processing, there occur events of "task activation (CT1)", "suspension-requesting mail existing (CT2)" and "active task termination (CT3)". If these events do not occur, the processing of the active task is continued at CT4. If another task is to be activated at CT1, data of the active task being executed is saved at CT11, and then the active task is suspended at CT12. If resumption of the task is expected at CT13, resumption information is recorded as task information at CT131, based on which the task is registered again in the original priority RDY at CT132.

When the suspension-requesting mail existing at CT2, it is determined whether or not the active task is in a suspensible state. If the active task is suspensible at CT21, an interruption-permitting mail is sent to the mailbox MBX at CT211, while if it is not suspensible at CT22, a suspension-inhibited mail is sent at CT221. It should be noted that although similar processing is executed to temporarily suspend the RUN processing, when the RUN processing (CT) being executed is switched to the RDY processing (R), the MBX processing (M) or the event-responsive processing (E), this processing is a basic routine for real-time monitoring which is different from the processing of switching to the other tasks, and hence description thereof is omitted. When the active task TCBr is terminated at CT3, the termination-notifying mail is transmitted to the mailbox at MBX CT31, and the following task activation is awaited at CT32.

Figure 17:
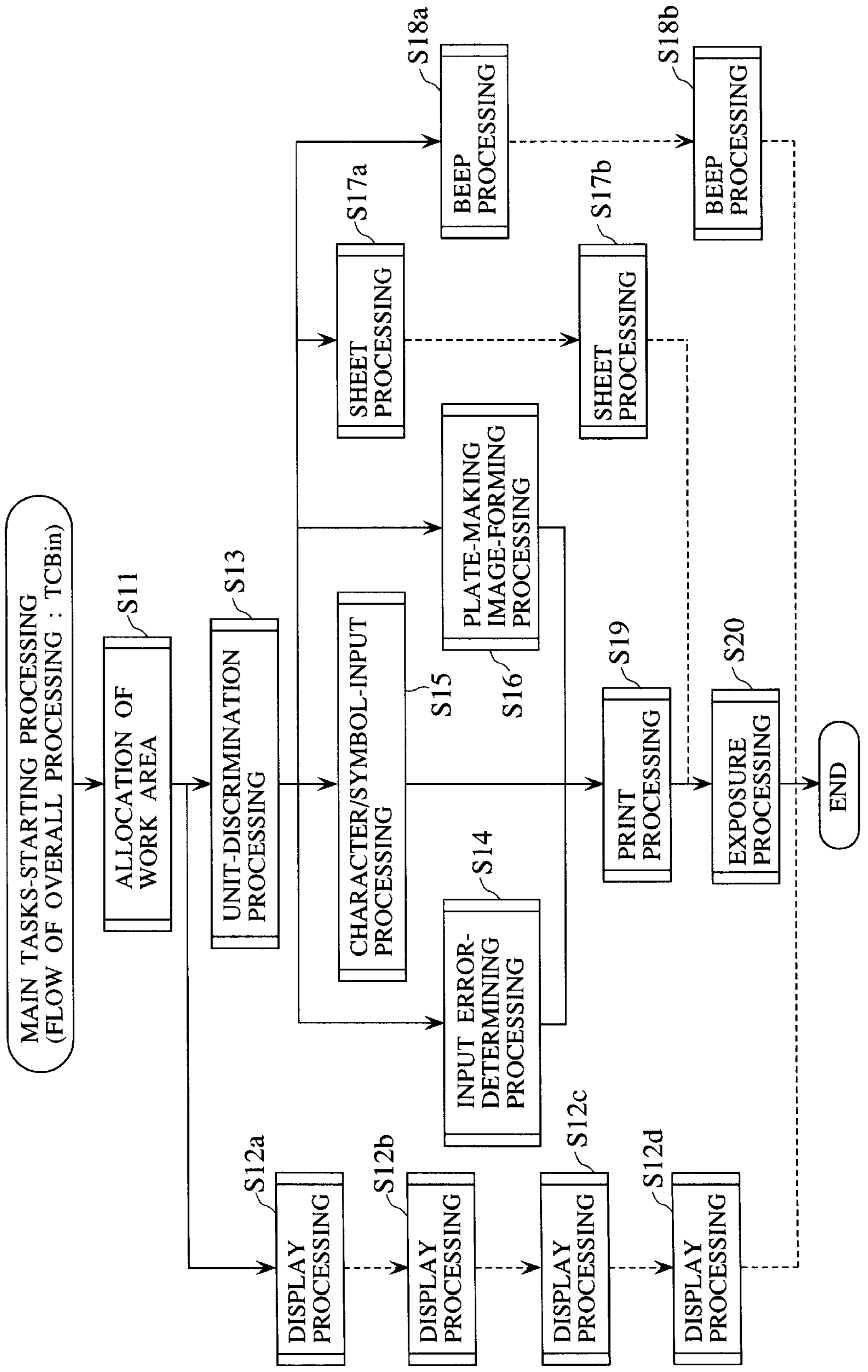
FIG. 17 is a flowchart of an example of major tasks-activating processing executed by the stamp-making apparatus.

FIG. 17 shows an example of the main tasks-starting processing. As shown in the figure, when the main tasks-starting processing task TCBin is activated, first, a task of allocating work area is registered in the mailbox MBX at a step S11, and then a task of display processing and a task of unit (stamp body)-discriminating processing are registered in the mailbox MBX at respective steps S12 and S13. Then, a task of input error-determining processing is registered at a step S14, a task of character/symbol-input processing at a step S15, a task of plate-making image (stamp image)-forming processing at a step S16, a task of sheet processing at a step S17, and a task of beep processing at a step S18. Then, after a task of print processing is registered at a step S19, a task of exposure processing is registered at a step S20. The MBX processing classifies these subtasks according to the order of priority and registers each of them in a proper priority RDYj, and then the RDY processing causes them to be activated one after another. Further, after these subtasks are started, subtasks of the subtasks are registered in the mailbox MBX as required and each of them is activated by the RDY processing.

That is, a plurality of tasks including the task TCBin of the initialization continue to be executed until they are each eventually delayed or placed in a wait state. The internal processing of the stamp-making apparatus 1 proceeds to a next step by the multitasking described above when another task as a cause of the wait state of a task has progressed to be deactivated, so that eventually, the internal processing of the multitasking enters a state in which an entry or other operation by the user is awaited. Conversely, once the user operates, the tasks therefor including error handling tasks are sequentially carried out, and eventually the program enters a state in which another operation by the user is awaited.

Therefore, the user actually feels that various processing operations or tasks are executed in parallel and simultaneously. That is, according to the processing of the present stamp-making apparatus 1, compared with a manner of processing in which the processing proceeds to a next step each time only in response to an operation by the user, various kinds of processing operations which will be required to be executed later can be executed in advance, whereby a time period during which the man or user has to wait can be minimized, enabling high-speed processing to be attained. It should be noted that parallel processing, such as the multitasking processing described above, can be realized by forming the program or all the tasks described above by interrupt handlers and employing an interrupt control circuit which controls the order of priority of interrupts generated.

The dotted lines appearing in FIG. 17 show that tasks appear to be simultaneously executed in parallel with each other. Further, the task of character/symbol-input processing (step S15), the task of input error-determining processing (step S14), and the task of plate-making image-forming processing (step S16) are simultaneously executed. More specifically, after a first entry of characters or the like (letters, symbols, figures, or the like) is effected, and before the following entry of characters or the like is effected (step S15), it is determined at the step S14 whether or not there is an inconvenience in the number of characters entered in a text, and an image for use in the plate-making is formed at the step S16. In the course of executing these steps, if a character entry is carried out at the step S15, the task of the input error-determining processing (S14) and that of the plate-making image-forming processing (step S16) are immediately stopped, and then resumed from the start thereof. In the meanwhile, the display processing (step S12, shown as S12*a* to S12*d*) and the beep processing (step S18, shown as S18*a* and S18*b*), further, the sheet processing (step S17, shown as S17*a* and S17*b*) responsive to insertion of the plate-making sheet, are being executed in parallel with the above steps.

In the case of this stamp-making apparatus, the electronic apparatus of the present invention is formed by the control block 300, the function switch 8, the light-emitting elements 12, the beeper 333, the operating block 21, and the stamp-detecting block 66. Now, operations characteristic of the electronic apparatus will be described with reference to FIGS. 18 to 22.

Figure 18:
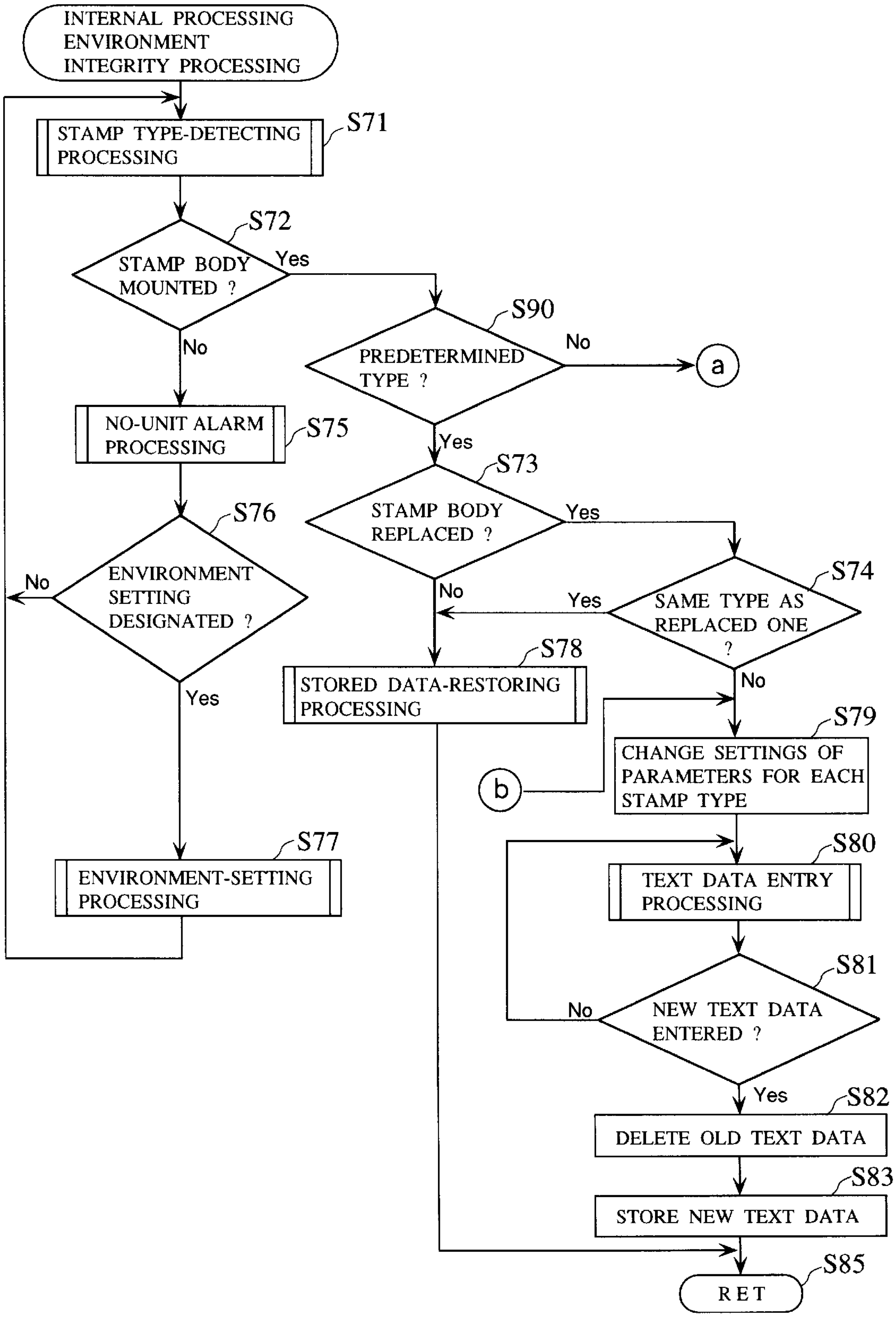
FIG. 18 is a flowchart showing the overall processing by the electronic apparatus according to the embodiment.

As shown in FIG. 18, the electronic apparatus executes processing for internal processing environment integrity of the stamp-making apparatus 1 (hereinafter referred to as "the internal processing environment integrity processing"). This processing is started as a subtask of the unit-discriminating processing (step S13 in FIG. 17) during execution of the same. In the internal processing environment integrity processing, first, information on results of stamp type-discriminating processing executed as another routine is read in at a step S71. That is, at this step, information is obtained on the results of the stamp type-discriminating processing in which it is determined based on an output from the stamp-detecting block 66 whether or not a stamp body (unit) A is set in the pocket 6, and if a unit is set, it is determined what type of stamp body A is mounted.

Next, it is determined at a step S72 whether or not the stamp body A is set, based on the information read in at the step S71. If no stamp body A is set, i.e. if the answer to the question of the step S72 is negative (NO), no-unit alarm processing for giving an alarm notifying the user that no stamp body A is mounted is executed at a step S75, and thereafter it is determined at a step S76 whether or not setting of a processing environment has been designated. If tho answer to the question of the step S76 is affirmative (YES), environment-setting processing is executed at a step S77, whereas if the answer to the question of the step S76 is negative (NO), the program returns to the step S71, wherein information is obtained again from the stamp type-discriminating processing.

The stamp type-discriminating processing (S71) is executed as an independent task. Therefore, whenever a stamp body A is mounted, removed, or replaced with another stamp body A in the course of the internal processing environment integrity processing, the same processing is resumed with the step S71. Actually, the no-unit alarm processing (S75) is carried out in operational guide processing (see FIG. 25), referred to hereinafter, which is started as a subtask of the display processing (S12*a* to S12*d* in FIG. 17) during execution thereof, while text data entry processing (S80) and new text data entry-determining processing (S81) are carried out by the character/symbol-input processing (S15 in FIG. 17). However, these tasks of processing have causal relations with the present processing, so that FIG. 18 shows them as parts of the present processing for the convenience of explanation of a procedure thereof.

In the no-unit alarm processing (S75), an indication or message of "NO UNIT" is displayed on the display 24 by the operational guide processing shown in FIG. 25, and at the same time the light-emitting element (LED) 12 in the "OPEN" position of the function switch 8 flickers quickly i.e. at short time intervals. Further, if "BEEPER ON" has been selected in the environment-setting processing, as described hereinafter, the beeper 333 sounds. Being notified by the message and alarm that no stamp body A (workpiece, also called "unit") is set in the pocket 6, the user can avoid carrying out unnecessary operations for data input or the like, and at the same time the stamp-making apparatus 1 is prevented from executing unnecessary data processing and physical (photochemical) processing for stamp image-engraving.

The environment-setting processing (S77) is started by pushing a predetermined push button of the push button group 22 during execution of the no-unit alarm processing. That means that only when the answer to the question of the step S76 is affirmative (YES), i.e. when it is confirmed that the setting of the environment has been designated, the environment-setting processing (S77) is started. In this processing, first, one of options, i.e. "BEEPER", "DENSITY", "DEMO MODE" and "POSITION" at Level 1, which are listed in a table shown in FIG. 19, normally an option selected in the immediately preceding setting is displayed on the display 24. The displayed option can be changed over from one to another by turning the operating dial 23.

When a desired option is displayed, the user can select the option, i.e. settle the selection of an option by pushing the execution key 31 arranged in the center of the operating dial 23. Once the option at Level 1 is selected, one of options at Level 2 in the FIG. 19 table under the option selected at Level 1 is displayed on the display 24. The user can select a desired option in the same manner as at Level 1. When these selections are completed, the processing can be terminated by pushing the predetermined push button, whereupon the program returns to the stamp type-discriminating processing (S71). The selected options are preserved even after completion of the environment-setting processing (S77), until the stamp-making apparatus 1 is reset or the environment-setting processing is carried out again.

As shown in FIG. 19, when the option "BEEPER" is selected from Level 1, it is possible to select between "ON" and "OFF" from Level 2. By this selection, the user can choose either sounding or non-sounding of the beeper 333 which should occur when each button or key of the push button group 22 and the operating dial 23 is pushed as well as when an alarm is to be given. By default, the operation of the character entry key (dial) 33 does not produce a beep, whereas important ones of alarms, such as an alarm to be given when a stamp body A is not removed immediately after the exposure is completed, accompany sounding of the beeper 333. It should be noted that these options described above can be changed by changing fixed data stored in the ROM 302 in designing or re-designing the stamp-making apparatus 1, or alternatively, the options may be offered in a more detailed manner during the environment-setting processing to thereby enable the user to store the selected options in the RAM 303 as the user's own data.

Further, when the option "DENSITY" is selected from Level 1, it is possible to choose a level of printing density out of the seven levels ranging from "+3" to "−3" at Level 2 so as to optimize the plate-making operation. The stamp-making apparatus 1 is constructed such that in response to this selection, a time period during which a strobe pulse is applied to the print head 56 of printing block 64 can be changed, to thereby change printing density. When "POSITION" is selected from Level 1, it is possible to choose any of fifteen positions from "PRO 7" to "RETRO 7" at Level 2. If a distance between a position of a plate-making sheet B for starting feed thereof for plate-making operation (i.e. when a bush button is pushed for starting "plate-making") and a position of the same for actually starting plate-making operation is made different from a proper value due to some mechanical factor, the distance can be changed or adjusted by selecting one of these 15 levels.

Further, when the option "DEMO MODE" is selected from Level 1, the display 24 starts to display a demonstration for introducing the stamp-making apparatus, e.g. by displaying a message of "This product enables you to make authentic "stamps" easily . . . ". As described hereinabove, the options selected are preserved or stored until the settings of the processing environment of the apparatus 1 are changed, so that display of the demonstration is started, whenever the power is turned on without the unit to designate the environment-setting processing (S77) by pushing the push button after the no-unit alarm processing (S75). If no operation is carried out during a certain time period after completion of the demonstration, the display repeatedly starts the demonstration from the beginning thereof. The program may be set such that it automatically proceeds to the demonstration display after the no-unit alarm processing (S75).

For example, when the stamp-making apparatus 1 is shown for sale in a store with no stamp body A mounted in the pocket 6, the above demonstration enables the apparatus to introduce itself to customers, which makes it possible to save salesclerks the trouble of explaining the features of the product. Further, it is preferable that the demonstration is programmed such that a sequence of operations can be followed by the customer on the screen as if a stamp body A were mounted in the pocket 6. If the customer can input tentative data, it is possible to get rid of the customer's uneasiness about operating the apparatus to thereby stimulate his or her interest in the product. On the other hand, since no stamp body A is mounted actually, waste of stamp bodies A for the sake of introduction to the product, i.e. stamp-making apparatus can be avoided.

Referring again to FIG. 18, if a stamp body A is set in the pocket 6, i.e. if the answer to the question of the step S72 is affirmative (YES), it is determined at a step S90 whether or not the stamp body A belongs to any of predetermined types. If the answer to the question of the step S90 is affirmative (YES), i.e. if the stamp body A is of a predetermined type, it is determined at a step S73 whether or not a different stamp body A from the one on which the immediately preceding determination was made is set, i.e. whether or not stamp bodies A have been changed.

This determination is carried out, based on whether information was obtained again from the stamp type-discriminating processing (S71) between the immediately preceding determination and the present one. Further, even if the answer to the question of the step S73 is affirmative (YES), i.e. if the stamp body A on which the immediately preceding determination was made has been replaced with another stamp body A, it is determined at a step S74 whether or not the new stamp body A is of the same type as the replaced one. If the answer to the question of the step S74 is affirmative (YES), stored data-restoring processing is executed at a step S78. If the answer to the question of the step S73 is negative (NO), i.e. if stamp bodies A have not been changed, the stored data-restoring processing is executed at the step S78, as well.

In the stored data-restoring processing (S78), various settings stored in the immediately preceding internal processing environment integrity processing, several of which will be referred to hereinafter, as well as text data entered and image data processed at that time are restored, followed by terminating the internal processing environment integrity processing at a step S85.

On the other hand, if the answer to the question of the step S74 is negative (NO), i e. if the stamp body A is of a different type from the replaced one, settings of various parameters are changed according to the type of the newly set stamp body A at a step S79. For example, as shown in FIGS. 20A and 20C, settings of a size of characters, such as letters and figures, to be entered as elements of a stamp image, and a size of an area where the characters can be arranged for layout, are changed according to the type of the stamp body A. In FIGS. 20A and 20B, the distance between A and F represents the maximum longitudinal size of an area set for each stamp type, in which entered characters are arranged for layout, while the distance between B and E represents a longitudinal size of an area in which entered characters can be arranged for layout after characters are allocated to a forward portion (left side portion as viewed in FIGS. 20A and 20B) between A and B of a frame, shown in FIGS. 21 and 22, and a backward portion (right side portion as viewed in FIGS. 20A and 20B) between E and F of the frame. In FIG. 20C, examples of TYPE A and TYPE B are shown for each of the predetermined types of stamp bodies A. Further, as shown in FIG. 20B, the above longitudinal size of the area is changed, depending on whether predetermined layout processing for arranging characters for making an imprinted stamp image more attractive is to be executed. In FIG. 20B, the distances between B and C and between D and E represent respective margins produced by the predetermined layout processing. Therefore, the distance between C and D is equal to a longitudinal size of an area within which characters can be actually arranged for layout. Further, out of the prepared frames having predetermined forms shown in FIGS. 21 and 22, available types are set or changed according to the type of the stamp body A set in the pocket 6. These parameters (i.e. values of sizes) are defined in a manner corresponding to types of stamp bodies A and stored in the ROM 302.

Setting of these parameters makes it possible to process data for the respective types of stamp bodies A with accuracy. That is, in comparison with a case in which data processing is uniformly executed in an identical manner regardless of difference in type between stamp bodies A, the amount of data processing is reduced for all stamp bodies A but the one having largest numbers of contents of processing so that it is possible to prevent the stamp-making apparatus 1 from executing unnecessary processing but enable the same to carry out only necessary processing promptly.

When the settings of the various parameters have been changed according to the type of a stamp at the step S79, text data entry processing (S80) started in the character/symbol-input processing (S15) in FIG. 17 is placed in a first wait state (S81). Thereafter, if the answer to the question of the step S81 is affirmative (YES), i.e. when a first input of new text data is effected, the old text data is deleted at a step S82, and then the new text data is stored at a step S83, followed by terminating the internal processing environment integrity processing at the stop S85.

The deletion of the old text data (S82) prevents the input and processing of data from being erroneously executed based on the old data employed on the preceding occasion, when a stamp body A of a different type from the replaced one is set in the pocket 6. As a result, useless operations for data input and processing can be avoided, and at the same time it becomes possible to prevent the stamp body A from being inappropriately processed. Further, since the deletion of the old text data (S82) is carried out after completion of the first input of text data for the different type of stamp body A from the replaced one (S81), even if an undesired type of stamp body A different from the replaced one is set in the pocket 6 by mistake, it is possible to continue using the old text data so long as the erroneously set stamp body A is replaced with one of a type of the replaced one before inputting the new text data.

Next, description will be made of processing to be executed when a stamp body A of a type different from the predetermined ones is set in the pocket 6 of the stamp-making apparatus 1, i.e. when the answer to the question of the step S90 in FIG. 18 is negative (NO).

As described hereinabove, according to the stamp-making apparatus 1, when a stamp body A is mounted as a workpiece in the pocket 6 formed in the mechanical block body 5, the type of the stamp body A is discriminated to set an area in which a stamp image is to be formed. Then, the stamp image made through the character/symbol-input processing (S15) and the plate-making image-forming processing (S16) in FIG. 17 is printed on a plate-making sheet B, thereby simultaneously forming on the ink ribbon C a negative image of the same stamp image for use as a mask (S19), and finally the ultraviolet-curing resin (stamp surface Ad) of the stamp body A is exposed to ultraviolet rays for a predetermined time period via the mask formed with negative image (S20) to make a stamp.

The time period over which the exposure is required to be executed for curing the ultraviolet-curing resin of the stamp body A varies with the ambient temperature. As shown in FIG. 24, exposure time periods data of which is stored in the ROM 302 are set such that the exposure time period becomes longer as the ambient temperature is lower, and becomes shorter as the ambient temperature is higher, whereby an optimal exposure time period is determined based on the ambient temperature detected by the ambient temperature sensor 67.

Now, it is likely that stamps having various shapes will be needed in the future. However, if a stamp body having a different shape from the predetermined ones is mounted, and if the apparatus is not designed such that it can set an area for forming a stamp image suitable for the stamp body, it is impossible to make a stamp of the stamp body. In the stamp-making apparatus 1, two of the detecting switches 263, indicated by broken lines in FIG. 10, are utilized to avoid this inconvenience. That is, it is prescribed that a stamp body A of a different shape from the predetermined ones should be designed to be formed with type-detecting holes at respective portions corresponding to the detecting projections 267 of these two switches 263 at which ends of these projections meet.

Accordingly, assuming that the presence of a type-detecting hole is represented by "0" in a bit pattern, which means the "OFF" state of a corresponding detecting switch, and the absence of the same as "1" in the bit pattern, which means the "ON" state of a corresponding detecting switch, the first two bits of a six-bit pattern in the respective predetermined types of stamp bodies A shown in FIGS. 8A to 8G have values of "11" or "01", whereas the corresponding bits in the bit pattern detected of a newly required type of stamp body A have values of "00", whereby the stamp body A can be easily detected as a stamp body A of a different type from the predetermined ones.

Needless to say, the six-bit pattern can provide $2^6-1=63$ patterns apart from "000000" which means that no stamp body A is set, and hence it would also be possible to discriminate a stamp body A of a different type from the predetermined ones if only any other bit pattern than those representative of the current predetermined stamp types is set for the stamp body A of the different type. In the present embodiment, however, to make the settings for discrimination simple and easy, the method of allocating "00" to the first two bits is employed.

Figure 23A:
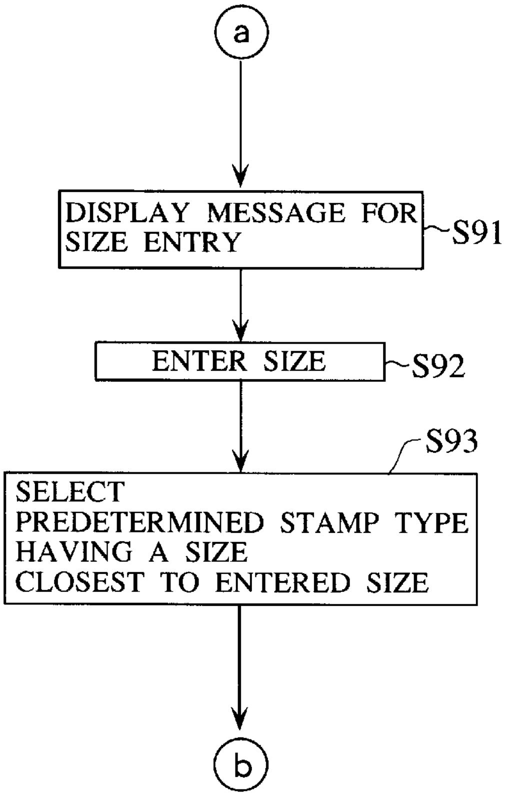
FIG. 23A is a flowchart showing a first example of processing carried out for dealing with a stamp body of a different type from predetermined ones.

If the stamp body A of a different type from the predetermined ones is set, i.e. if the answer to the question of the step S90 in FIG. 18 is negative (NO), the program proceeds to a step S91 in FIG. 23A, wherein a size entry message for requesting the user to enter the size of the stamp body A is displayed on the display 24. Then, after the width and length of the stamp surface of the stamp body A are entered in the number of dots (S92), a predetermined type of stamp body A which has a smaller stamp surface than the stamp body A currently set and is closest to the same in size is selected out of all the smaller predetermined stamp bodies A (S93). A list of dot numbers corresponding to respective values of width and length of stamp surfaces of stamp bodies A is provided in a sheet attached to the apparatus.

After the predetermined type is selected at the step S93, referring again to FIG. 18, the processing of changing settings of various parameters according to the selected type of the stamp body A is executed at the step S79 with reference to various parameters corresponding to each type of stamp body A stored in the ROM 302. More specifically, on the assumption that the predetermined types of stamp body A (selected at the step S93, in the present case) is actually set, settings of the character size and the area for characters, mentioned hereinabove with reference to FIGS. 20A to 20C, as well as an option as to whether the layout processing is to be executed, an available type of frame, etc. are changed. Then, as described above, the task of text data entry processing (S80) started in the character/symbol-input processing (S15) is placed in a first wait state (S81). Thereafter, when a first input of new text data is effected, i.e. when the answer to the question of the step S81 is affirmative (YES), the old text data is deleted at the step S82, and then the new text data is stored at the step S83, followed by terminating the internal processing environment integrity processing at the step S85.

Since the task of character/symbol-input processing (S15 in FIG. 17) and the task of plate-making image-forming processing (S16) are executed in parallel with each other, as described hereinabove, the plate-making image-forming processing (S16) is completed almost simultaneously with completion of processing from the text data entry processing (S80) to the new text data-storing processing (S83). After these tasks are completed, a mask formed with a negative image of the stamp image is prepared by the printing processing (S19), and the stamp surface (ultraviolet-curing resin) of the stamp body A is exposed to ultraviolet rays for a predetermined time period to make a stamp.

As described above, in the stamp-making apparatus 1, when a stamp body (workpiece) A of a different type from the predetermined ones is set in the pocket 6, a processing size (i.e. a size of a stamp surface to be worked or processed) which is smaller than and closest to a size entered as a processing size of the new or different type of stamp body A is selected out of the smaller predetermined processing sizes stored in the ROM (storage means) 302 and set as the processing size of the workpiece to be processed physically (more specifically, photochemically). This processing enables the stamp-making apparatus 1 to make and store internal data suitable for the newly set processing size, and carry out physical (photochemical) processing based on the stored data. Thus, the stamp-making apparatus 1 can carry out physical processing of a workpiece having a different shape from the predetermined ones, without any trouble.

Further, by selecting an input screen on the display 24 at which a processing size can be entered, the stamp-making apparatus 1 displays messages requesting the user to enter the size, thereby enabling the user to set the processing size with ease. Further, since the optimal exposure time periods corresponding to respective ambient temperature ranges are defined in internal data, it is possible to set an optimal exposure time period, based on the detected ambient temperature, to thereby carry out favorable physical processing.

Next, description will be made of another method employed when a stamp body A of a different type from the predetermined ones is mounted in the pocket 6, i.e. when the answer to the question of the step S90 is negative (NO). According to the method, values of elements associated with the processing of the stamp body, including a processing size thereof, are entered according to a predetermined input format to thereby set parameters of the stamp body A defining "stamp type" of the stamp body A of the different type. The format is set as a field in which, for example, values for setting the width and length of the stamp surface of a stamp body A, and an exposure time period therefor are input in a predetermined successive order each in the form of a predetermined number of digits allocated thereto.

In this case, a new setting value of the exposure time period to be entered corresponds to a predetermined ambient temperature range (e.g. above 22.5° C.) shown in the FIG. 24 data of exposure time periods set for the predetermined stamp bodies A. Further based on a ratio (e.g. ⅔) of the newly set exposure time period (e.g. 60 sec.) to the predetermined one (e.g. 90 sec.) in FIG. 24, it is possible to determine an optimal exposure time period corresponding to another ambient temperature range (e.g. 17.5 to 22.5° C.) by calculation (i.e. 95 sec×⅔=63.3 sec.). Thus calculated exposure time periods corresponding to the respective predetermined ranges of the ambient temperature can be arranged in order and stored as new data of exposure time periods. This assures that when new types of preferable ultraviolet-curing resin having respective various sensitivities to ultraviolet rays are produced and supplied in the future, the apparatus of the invention will be able to process or work stamp bodies using such new types of ultraviolet-curing resin.

Figure 23B:
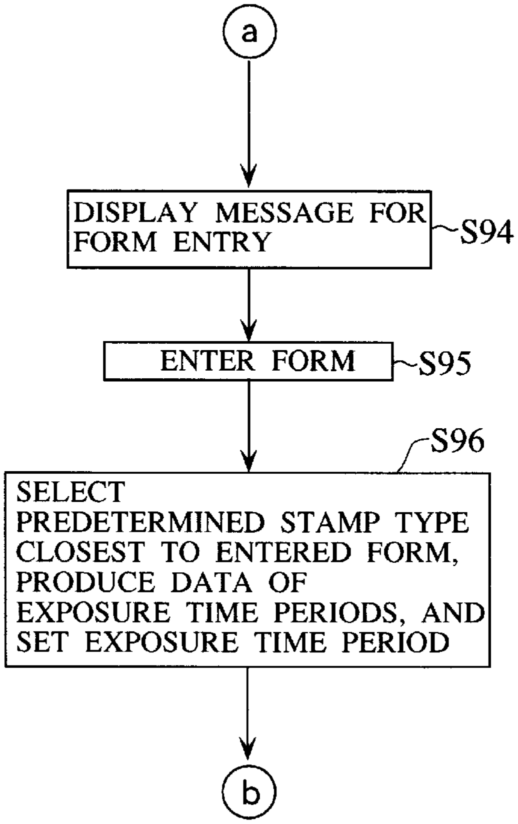
FIG. 23B is a flowchart showing a second example of processing carried out for dealing with a stamp body of a different type from the predetermined one.

If the stamp body A of a different type is set, i.e. if the answer to the question of the step S90 in FIG. 18 is negative (NO), processing in FIG. 23B is started wherein first at a step S94, a form entry guide message requesting the user to enter a form or stamp type is displayed on the display 24. When the form or stamp type is entered in the form of the above-mentioned format at a step S95, a stamp type smaller than and closest in size to the input stamp type is selected out of the predetermined stamp types, and at the same time new data on exposure time periods are produced and set based on the input exposure time period (S96).

When the task of selecting a stamp type out of the predetermined types and setting exposure time periods therefor (S96) is completed, referring again to FIG. 18, similarly to the procedure described hereinabove, the settings of various parameters are changed according to the selected stamp type (S79), and the task of text data entry processing (S80) is placed in a first wait state (S81). If the answer to the question of the step S81 is affirmative (YES), i.e. when a first input of the new text data is completed, the old text data is deleted at the step S82, and then the newly input text data is stored at the step S83, followed by terminating the internal processing environment integrity processing at the step S85. As described above, the plate-making image-forming processing (S16) is completed almost simultaneously with completion of the internal processing environment integrity processing, so that at the next step S19, the printing processing is carried out, and then the exposure processing is executed at the step S20, based on the newly produced and set data of the exposure time period, to thereby make a stamp.

According to the above method, since various parameters can be input based on a predetermined format, it is possible to change not only the settings of a processing size but also other various settings required for the physical (photochemical) processing, which also makes it possible to physically (photochemically) process a workpiece different in size or material from the predetermined ones.

Further, information on exposure time periods can be input by inputting data according to a format, whereby it is possible to store data of exposure time periods for a new type of workpiece as part of new internal data. This means that it is possible to carry out physical processing by the exposure not only on an existing type of workpiece for which data of exposure time periods have already been set but also on a new type of workpiece having the stamp surface thereof made of a photosensitive resin having a different sensitivity from that of any existing photosensitive resin. The new type of a workpiece can be favorably processed by defining exposure time periods suitable for a photosensitivity thereof. Further, even if the characteristics of photosensitive resin forming the stamp surface of a workpiece are changed in the future, an optimal exposure time period can be set in response to this change, thereby enabling the apparatus to process the now type of photosensitive resin.

Although, in the above embodiment, an exposure time period corresponding to a predetermined ambient temperature range is input to thereby obtain the ratio between the input exposure time period and a corresponding predetermined exposure time period, and then new data of exposure time periods are produced based on the obtained ratio, this is not limitative, but a coefficient representative of the ratio may be entered to produce the new data based thereon. Further, if the relationship between the ambient temperature and the exposure time period is not proportional, but e.g. if the relationship is represented by a curve of a quadratic function, the apparatus may be constructed such that the equation of a quadratic functional can be input. In such a variation, new data of exposure time periods for the physical (photochemical) processing can be easily set simply by inputting a coefficient or the equation of a function, whereby a new type of workpiece having a stamp surface made of a photosensitive resin having a different sensitivity can be as favorably processed as existing types of workpieces.

As mentioned hereinabove, the operational guide processing started as a subtask of the display processing (S12*a* to S12*d* in FIG. 17) executes no-unit alarm processing (S75), which enables the user to avoid unnecessary operations including data entry operations, and at the same time prevents the stamp-making apparatus 1 from carrying out unnecessary data processing and physical (photochemical) processing of a workpiece. Besides the no-unit alarm processing (S75), the operational guide processing executes various kinds of processing which facilitate the user's manual operation to thereby prevent the stamp-making apparatus 1 from being erroneously operated. Now, therefore, processing associated with the no-unit alarm processing will be described, and then the other kinds of processing executed by the operational guide processing will also be described, with reference to FIG. 25.

In the operational guide processing, basically, a next operating position is indicated by lighting of a corresponding one of the light-emitting elements (LED) 12, and slow flickering of the same indicates execution of processing, while quick flickering thereof an erroneous operation.

As shown in FIG. 25, when no stamp body (unit) A is mounted in the pocket 6, if the function switch 8 is rotated to the "OPEN" position from any other position, all the light-emitting elements 12 turn off. In the same state, if the function switch 8 is rotated to the "INPUT/PLATE- MAKING" position from any other position, the light-emitting element (LED) 12 in the "OPEN" position of the function switch 8 flickers quickly, i.e. at short time intervals, to indicate that the apparatus is being erroneously operated, and the indication or message of "NO UNIT" notifying the user that no unit is mounted in the pocket 6 is displayed on the display (LCD) 24, thereby urging the user to open the lid 7 and mount a unit in the pocket 6. Similarly, when the function switch 8 is rotated from any other position to the "EXPOSURE" position, the light-emitting element (LED) 12 in the "OPEN" position of the function switch 8 flickers quickly, thereby notifying that no unit is mounted in the pocket 6. Further, when the function switch 8 is rotated from any other position to the "OFF" position, all the light-emitting elements 12 turn off.

When a unit is mounted but no characters are input in the text area, if the function switch 8 is rotated from the "OFF" position to the "INPUT/PLATE-MAKING" position, the light-emitting element 12 in the "INPUT/PLATE-MAKING" position is lit to indicate the new operating position, and at the same time a line head-indicating mark for guiding the user in entering characters is displayed on the display 24, whereby a character entry by the user is awaited.

When the function switch 8 is in the "INPUT/PLATE-MAKING" position, and a unit is mounted in the pocket 6, but no characters are entered as the text data, if the button 22*a* for plate-making is pushed, the light-emitting element 12 in the "INPUT/PLATE-MAKING" position continues to be lit, but soft alarm indications are displayed on the display 24 to urge the user to enter characters. The soft alarm indications are e.g. in the form of a unit size displayed for a very short time, and characters in a flickering state which were selected by the operating dial 23 but have not been entered yet (not settled for entry).

When the function switch 8 is in the "INPUT/PLATE-MAKING" position, a unit is mounted in the pocket 6, and characters are entered as the text data, but no plate-making sheet B is inserted, if the button 22*a* for plate-making processing is pushed, the light-emitting element 12 in the "INPUT/PLATE-MAKING" position flickers slowly, and an indication or message of "INSERT A SHEET" is displayed on the display 24, urging the user to insert a plate-making sheet B.

When the function switch 8 is in the "INPUT/PLATE-MAKING" position, a unit is mounted in the pocket 6, characters are entered as the text data, and a plate-making sheet B is inserted, if the button 22*a* for plate-making processing is pushed, the light-emitting element 12 in the "INPUT/PLATE-MAKING" position flickers slowly, and an indication or message of "MAKING A PLATE" is displayed on the display 24.

When the function switch 8 continues to be in the "INPUT/PLATE-MAKING" position even after the plate-making is completed, the light-emitting elements 12 in the "INPUT/PLATE-MAKING" position and the "EXPOSURE" position are lit to indicate that data re-entry or exposure is required to be carried out next. At this time, the characters entered as the text data are displayed on the display 24 to thereby permit the user to carry out re-entry of data.

When the function switch 8 is rotated from the "INPUT/PLATE-MAKING" position to the "EXPOSURE" position after the plate-making is completed, the light-emitting element 12 in the "EXPOSURE" position flickers slowly as a sign of execution of the plate-making processing, and an indication of "UNDER EXPOSURE" is displayed on the display 24.

When the exposure is normally completed, the light-emitting element in the "EXPOSURE" position flickers quickly, and an guide message is displayed on the display 24 to advise the user to remove the unit out of the pocket 6. At the same time, the alarm is given by the beep referred to hereinabove. This warning operation is carried out because if the user forgets to remove the exposed unit, even a portion of the ultraviolet-curing resin which does not need curing is cured due to the action of sunlight and/or indoor fluorescent light. The unit has to be removed immediately after completion of the exposure to ultraviolet rays and have the uncured portion washed away.

On the other hand, when a unit is mounted in the pocket 6 and characters are input in the text, but the plate-making button 22*a* is not pushed yet, if the function switch 8 is rotated from the "INPUT/PLATE-MAKING" position to the "EXPOSURE" position, the light-emitting element 12 in the "INPUT/PLATE-MAKING" position flickers quickly, and a message is displayed on the display 24 to advise the user to carry out plate-making. In this case, the program is inhibited from proceeding to the following step until the task of plate-making is carried out. Further, even if the function switch 8 is returned to the "INPUT/PLATE-MAKING" position, when there is any inconvenience in the mechanical block 4 and hence the function switch 8 has to be returned to the "OFF" position, no processing is permitted to be executed until the function switch 8 is returned to the "OFF" position.

As described above, the operational guide processing of the stamp-making apparatus 1 can guide the user in operating the apparatus through flickering positions of the light-emitting elements 12 and messages displayed on the display 24, etc. Therefore, a predetermined sequence of operations can be executed smoothly without consulting the owner's manual. Further, since the light-emitting elements 12 indicate a next operating position by lighting, execution of processing by slow flickering, and a visual alarm notifying an erroneous operation by quick flickering, the user can clearly discriminate between the guide to a next operating position, the indication of processing being executed, and an alarm indicating an erroneous operation. The alarm makes it possible for the user to promptly deal with an erroneous operation. It should be noted that the functions of the quick flickering and the slow flickering of the light-emitting elements 12 may be carried out in a reversed manner.

It is further understood by those skilled in the art that the foregoing is preferred embodiments of the invention, and that various changes and modifications may be made without departing from the sprit and scope thereof.

What is claimed is:

1. An electronic apparatus having a body formed with a pocket for removably mounting a workpiece therein, said electronic apparatus carrying out physical processing on said workpiece mounted in said pocket based on internal data, said electronic apparatus comprising:

detecting means for detecting mounting of said workpiece in said pocket; and alarm means for giving an alarm indicating that no workpiece is mounted in said pocket, if said detecting means does not detect said mounting of said workpiece after said electronic apparatus is started.

2. An electronic apparatus according to claim 1, including a plurality of alarm elements, and alarm element-selecting means for selecting at least one of said plurality of alarm elements, and wherein said alarm means gives said alarm by using said at least one of said plurality of alarm elements selected by said alarm element-selecting means.

3. An electronic apparatus according to claim 1, including demonstration display means for carrying out demonstration display to introduce said electronic apparatus to customers, and demonstration display-switching means for switching between a state of execution of said demonstration display and a state of non-execution of said demonstration display, and wherein said demonstration display means is capable of operating irrespective of whether said alarm means gives said alarm, when said detecting means does not detect said mounting of said workpiece and said demonstration display-switching means is switched to said state of execution of said demonstration display.

4. An electronic apparatus having a body formed with a pocket for removably mounting each of a plurality of kinds of workpieces therein, said electronic apparatus carrying out physical processing on said each of plurality of kinds of workplaces mounted in said pocket in a manner dependent on a kind of said each of said plurality of kinds of workpieces, based on internal data, said electronic apparatus comprising:

kind-detecting means for detecting said kind of said each of said plurality of kinds of workpieces mounted in said pocket;

workpiece-discriminating means for discriminating whether or not a workpiece different in kind from a workpiece mounted on an immediately preceding occasion is mounted, based on results of detection by said kind-detecting means; and data-deleting means for deleting text data used on said immediately preceding occasion, based on results of discrimination by said workpiece-discriminating means.

5. An electronic apparatus according to claim 4, wherein said data-deleting means deletes said text data used on said immediately preceding occasion, after text data for said workpiece different in kind from said workpiece mounted on said immediately preceding occasion is entered.

6. An electronic apparatus having a body formed with a pocket for removably mounting each of a plurality of kinds of workpieces therein, said electronic apparatus carrying out physical processing on said each of plurality of kinds of workpieces mounted in said pocket in a manner dependent on a kind of said each of said plurality of kinds of workpieces, based on internal data, said electronic apparatus comprising:

kind-detecting means for detecting said kind of said each of said plurality of kinds of workpieces mounted in said pocket; and parameter-setting means for setting parameters for use in processing internal data required in said physical processing executed in said manner dependent on said kind of said each of said plurality of kinds of workpieces.

7. An electronic apparatus according to claim 6, wherein said parameter-setting means includes:

memory means for storing processing sizes corresponding to said plurality of kinds of workpieces;

mode changeover means for switching a mode of internal processing of said electronic apparatus to a processing size entry mode for entering a processing size of an area of said workpiece to be processed, when said kind-detecting means detects a different kind of workpiece mounted in said pocket, which is different in shape different from shapes of said plurality of kinds of workpieces; and processing size-setting means for, in response to said processing size entered, selecting one of said predetermined processing sizes which is closest in shape to said processing size entered and at the same time smaller than said processing size entered, to thereby set said selected one of said predetermined processing sizes as a processing size of said different kind of workpiece mounted in said pocket, when said internal processing of said electronic apparatus is in said processing size entry mode.

8. An electronic apparatus according to claim 7, including display means, wherein said mode changeover means changes a screen of said display means to a screen in which a processing size can be entered, when said internal processing of said electronic apparatus is in said processing size entry mode.

9. An electronic apparatus according to claim 8, wherein said mode changeover means permits a plurality of processing-related elements including a processing size to be entered in a predetermined format, when said internal processing of said electronic apparatus is in said processing size entry mode.

10. An electronic apparatus according to claim 7, wherein said mode changeover means permits a plurality of processing-related elements including a processing size to be entered in a predetermined format, when said internal processing of said electronic apparatus is in said processing size entry mode.

11. An electronic apparatus according to claim 9, wherein said workpiece has a work surface formed of a photosensitive resin, and wherein said physical processing is carried out by exposure of said photosensitive resin to light.

12. An electronic apparatus according to claim 11, wherein said mode changeover means permits an exposure time period to be entered as one of said plurality of processing-related elements when said internal processing of said electronic apparatus is in said processing size entry mode.

13. An electronic apparatus for carrying out exposure as physical processing on a workpiece having a portion formed of a photosensitive resin having a temperature-dependent property, based on internal data, comprising:

memory means for storing internal data defining exposure time periods corresponding to ambient temperatures;

temperature-detecting means for detecting an ambient temperature;

exposure time-setting means for setting an exposure time period according to said ambient temperature detected by said temperature-detecting means based on said internal data; and exposure means for carrying out exposure on said workpiece over said exposure time period set by said exposure time-setting means.

14. An electronic apparatus according to claim 13, including entry means capable of permitting an exposure time period for a new kind of workpiece to be entered in a predetermined format, said entry means forming data of new exposure time periods corresponding to said ambient temperatures based on entry of said exposure time period for said new kind of workpiece effected in said predetermined format, and causing said memory means to store said data of new exposure time periods as part of said internal data.

15. An electronic apparatus according to claim 14, wherein said entry means permits a coefficient of said exposure time periods corresponding to said ambient temperatures to be entered in said predetermined format, and produces data of said exposure time periods by arithmetic operations based on said coefficient.

16. An electronic apparatus according to claim 14, wherein said entry means permits an equation of a quadratic function defining exposure time periods with respect to ambient temperatures to be entered in said predetermined format, and produces data of said exposure Lime periods by arithmetic operations based on said equation of said quadratic function.

17. A method of processing a workpiece by an electronic apparatus, the workpiece having a portion formed of a photosensitive resin having a temperature-dependent property, said method comprising the step of carrying out exposure on the workpiece over a time period, the time period being dependent on an ambient temperature.

18. A method of processing a workpiece by an electronic apparatus according to claim 17, wherein the portion of the photosensitive resin is unexposed prior to the step of carrying out exposure.

19. A method of guiding manual operations of an electronic apparatus to be effected by a user in a manner following a predetermined procedure by the use of an operating element of said electronic apparatus, for causing said electronic apparatus to carry out various kinds of processing, said method comprising the steps of:

arranging marks for kinds of processing of said electronic apparatus, and light-emitting means for respective ones of said marks, in a manner corresponding to a plurality of operating positions of said operating element;

causing one of said light-emitting means in an active position of said plurality of operating positions of said operating element to flicker, to thereby indicate execution of a kind of processing corresponding to said active position of said plurality of operating positions of said operating element; and causing another of said light-emitting means in another of said plurality of operating positions of said operating element to be made active next to be operated, after completion of said processing corresponding to said active position of said plurality of operating positions of said operating element, to thereby guide said user to a next step of processing.

20. A method according to claim 19, wherein when said operating element is operated in an erroneous manner, one of said light-emitting means in a proper one of said plurality of operating positions of said operating element is caused to flicker at time intervals different from time intervals of flickering made to indicate said execution of said kind of processing corresponding to said active position of said plurality of operating positions of said operating element.

21. A method according to claim 19, wherein operation of said one of said light-emitting means in said one of said plurality of operating positions of said operating element to be made active next is lighting.

22. An electronic apparatus having a body formed with a pocket for removably mounting a workpiece therein, said electronic apparatus carrying out physical processing on said workpiece mounted in said pocket based on internal data, said electronic apparatus comprising:

a detecting device that detects mounting of said workpiece in said pocket; and an alarm device that gives an alarm indicating that no workpiece is mounted in said pocket, if said detecting device does not detect said mounting of said workpiece after said electronic apparatus is started.

23. An electronic apparatus having a body formed with a pocket for removably mounting each of a plurality of kinds of workpieces therein, said electronic apparatus carrying out physical processing on said each of plurality of kinds of workpieces mounted in said pocket in a manner dependent on a kind of said each of said plurality of kinds of workpieces, based on internal data, said electronic apparatus comprising:

a kind-detecting device that detects said kind of said each of said plurality of kinds of workpieces mounted in said pocket; and a parameter-setting device that sets parameters for use in processing internal data required in said physical processing executed in said manner dependent on said kind of said each of said plurality of kind of workpieces.

24. An electronic apparatus for carrying out exposure as physical processing on a workpiece having a portion formed of a photosensitive resin having a temperature-dependent property, based on internal data, said electronic apparatus comprising:

a memory that stores internal data defining exposure time periods corresponding to ambient temperatures;

a temperature-detecting device that detects an ambient temperature;

an exposure time-setting device that sets an exposure time period according to said ambient temperature detected by said temperature-detecting device based on said internal data; and an exposure device that carries out exposure on said workpiece over said exposure time period set by said exposure time-setting device.

* * * * *

UNITED STATES PATENT AND TRADEMARK OFFICE

CERTIFICATE OF CORRECTION

PATENT NO. : 6,058,336
DATED : May 2, 2000
INVENTOR(S) : Hayama et al.

It is certified that error appears in the above-identified patent and that said Letters Patent is hereby corrected as shown below:

Title page,
Item [73], add -- King Jim Co., Ltd., Tokyo, Japan --

Signed and Sealed this

Ninth Day of July, 2002

*Attest:*

JAMES E. ROGAN

*Attesting Officer*

*Director of the United States Patent and Trademark Office*